United States Patent
Endoh

(10) Patent No.: US 6,556,537 B1
(45) Date of Patent: Apr. 29, 2003

(54) OPTICAL RECORDING MEDIUM HAVING TWO PIT TRAINS OF MUTUALLY DIFFERENT DEPTHS, AND MASTER FOR MANUFACTURING THE OPTICAL RECORDING MEDIUM

(75) Inventor: Sohmei Endoh, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/431,604

(22) Filed: Nov. 1, 1999

(51) Int. Cl.⁷ .................................................. G11B 7/24
(52) U.S. Cl. ................................. 369/275.4; 369/109.02
(58) Field of Search ........................... 369/109.01–109.2, 369/275.1–275.5

(56) References Cited

U.S. PATENT DOCUMENTS

| | | | |
|---|---|---|---|
| 4,723,903 A | | 2/1988 | Okazaki et al. |
| 4,963,464 A | * | 10/1990 | Setani |
| 5,060,223 A | * | 10/1991 | Segawa |
| 5,121,376 A | * | 6/1992 | Kuder et al. |
| 5,168,490 A | * | 12/1992 | Braat |
| 5,339,304 A | * | 8/1994 | Hanaoka |
| 5,508,996 A | | 4/1996 | Endoh ..................... 369/275.3 |
| 5,553,051 A | * | 9/1996 | Sugiyama et al. |
| 5,602,819 A | * | 2/1997 | Inagaki et al. |
| 5,822,294 A | | 10/1998 | Ohtomo et al. |
| 6,349,085 B1 | | 2/2002 | Endoh et al. |

FOREIGN PATENT DOCUMENTS

| | | |
|---|---|---|
| EP | 0 414 429 | 2/1991 |
| EP | 0 546 525 | 6/1993 |
| EP | 0 596 439 | 5/1994 |
| EP | 0 708 439 | 4/1996 |
| EP | 0 735 529 | 10/1996 |
| EP | 0 813 193 | 12/1997 |

OTHER PUBLICATIONS

Patent Abstracts of Japan, vol. 1998, No. 11, Sep. 30, 1998, JP 10 154356, Jun. 1998.
Patent Abstracts of Japan, vol. 2000, No. 01, Jan. 31, 2000, JP 11 0296910, Oct. 29, 1999.
Patent Abstracts of Japan, vol. 1999, No. 03, Mar. 31, 1999, JP 10 340456, Dec. 22, 1998.

* cited by examiner

Primary Examiner—W. R. Young
(74) Attorney, Agent, or Firm—Oblon, Spivak, McClelland, Maier & Neustadt, P.C.

(57) ABSTRACT

In an, optical disc recording medium having formed thereon a first pit train and a second pit train, these pit trains are formed to be different in pit depth from each other and meet following two relations:

$$Y \geq 0.5M + 73.0411 - 1098.4983(X-0.5K) + 6584.7191(X-0.5K)^2 - 19632.4312(X-0.5K)^3 + 29119.8871(X-0.5K)^4 - 17190.8276(X-0.5K)^5$$

$$Y \leq 0.5M - 27.1270 + 307.9548(X-0.5K) - 1283.3732(X-0.5K)^2 + 235.2052(X-0.5K)^3 - 1620.1442(X-0.5K)^4$$

where X: Phase depth of first pit train
Y: Phase depth of second pit train
K and M: Arbitrary integers.

2 Claims, 10 Drawing Sheets

OPTICAL RECORDING MEDIUM HAVING TWO PIT TRAINS OF MUTUALLY DIFFERENT DEPTHS, AND MASTER FOR MANUFACTURING THE OPTICAL RECORDING MEDIUM

BACKGROUND OF THE INVENTION

1. Field of the Invention

The present invention relates to an optical recording medium having data recorded in the form of a train of pits, a master for use in production of the optical recording medium having data recorded in the form of a train of pits, and an optical recording/reproducing apparatus to write and/or read data to and/or from an optical recording medium having data recorded in the form of a train of pits.

2. Description of the Related Art

As a typical one of the optical recording media, an optical disc to and/or from which data is optically written and/or read, is well known. The optical disc includes a read-only type having data pre-recorded in the form of a train of pits, a magneto-optic type to and from which data is written and read using the magneto-optical effect, and a phase-change type to and from which data is written and read using a phase change of a recording layer thereof.

For these types of optical discs, it is very important that tracking servo and track seek can stably be done during data write and/or read. Note that the "tracking servo" is to have a light spot track a recording track. The "track seek" is to move the light spot to a desired recording track. For the track seek, it is necessary to count recording tracks the moving light spot has traversed until the light spot arrives at the desired recording track. This is generally called "traverse count".

Conventionally, the reading resolution of an optical pickup mounted in an optical recording/reproducing apparatus has been improved to attain a high density of recording in the conventional optical discs. For the conventional optical discs, a main measure taken to improve the reading resolution of the optical pickup is to use a laser light of a shorter wavelength λ for reading data or an objective lens having a larger numerical aperture (NA) for focusing the laser light onto an optical disc.

The wavelength λ of a laser light used to read data, numerical aperture (NA) of objective lens and track pitch will be shown in Table 1 concerning CD, MD, MD Data 2, DVD+RW and DVD-ROM as examples of tie optical disc.

TABLE 1

|  | Laser light wavelength in nm | Numerical aperture NA | Track pitch in μm | Recording density |
|---|---|---|---|---|
| CD, MD | 780 | 0.45 | 1600 | Low |
| MD Data2 | 650 | 0.52 | 950 | ↑ |
| DVD + RW | 650 | 0.60 | 800 | ↓ |
| DVD − ROM | 650 | 0.60 | 740 | High |

As shown in Table 1, the conventional optical discs use a laser light of a shorter wavelength λ or an objective lens having a larger NA to implement a narrow track, whereby a high recording density is attained.

Even with the narrow track for the conventional optical discs, however, the spatial frequency of the track pitch is limited to the order of a half to two/thirds of the cut-off frequency of the optical pickup of the optical recording/reproducing apparatus. Note that the "cut-off frequency" is a frequency at which the reproduced signal amplitude is approximately zero. On the assumption that a laser light used to read data has a wavelength λ and an objective lens used to focus the laser light on the optical disc has a numerical aperture NA, the cut off frequency is 2NA/λ.

The reason why the spatial frequency of the tack pitch is limited to a half to two/thirds of the cut-off frequency is that signals necessary for tracking servo and track seek should have sufficient levels, respectively, for stability of the tracking servo and track seek.

More specifically, a signal indicative of a difference between outputs from two photodetectors disposed symmetrically with respect to the track center of an optical disc (so-called "push-pull" signal) and a sign al indicative of a sum of the outputs from the two photodetectors (so-called "cross-track" signal) are used for the tracking servo and track seek.

Referring now to FIG. 1, there is illustrated how to produce a push-pull signal and cross-track signal. As shown, the push-pull signal is produced by detecting a reflected light from an optical disc by two photodetectors A and B disposed symmetrically with respect to the track center of an optical disc and taking a difference (A−B) between the two outputs from the two photodetectors A and B. The cross-track signal is produced by taking a sum (A+B) of the outputs from the two photodetectors A and B.

More particularly, assume here that two photodetectors are symmetrically with respect to the track center of an optical disc to detect a reflected light from the optical disc during data write and/or read from the optical disc. On the assumption that a quantity of light detected by one of the two photodetectors is A and that detected by the other photodetector is B. A signal indicative of a difference between the quantities A and B is a push-pull signal which is expressed as A+B, while a signal indicative of a sum of the quantities A and B is a cross-track signal which is expressed as A−B. Assume that the push-pull signal has an amplitude C, cross-track signal has an amplitude D and the value of the cross-track signal at a mirror surface portion of the optical disc where no trains of pits are formed is Mmax. Then, the push-pull signal amplitude ratio is expressed by C/Mmax, while the cross-track signal amplitude ratio is expressed by D/Mmax.

For MD Data 2 and DVD+RW, for example,the push-pull method is adopted for the tracking servo. Namely, the push-pull signal is used for the tracking servo. For a high stability of the tracking servo, the push-pull signal amplitude ratio has to be about 0.10 or more. For the track seek, cross-track signal is used for the traverse count. The cross-track amplitude ratio has to be about 0.05 or more. Further, in case data has been prerecorded as a train of pits on the optical disc, the pit modulation of the shortest pit has to be about 0.08 or more for normal reading of the data.

Thus, in MD data2 and DVD+RW, the spatial frequency of the track pitch is limited to a range of a half to two/thirds of the cut-off frequency for the push-pull signal amplitude ratio to be 0.10 or more, cross-track signal amplitude ratio to be 0.05 or more and for the pit modulation of the shortest pit to be 0.08 or more.

For CD and MD, the three-spot method is adopted for the tracking servo. Namely, the cross-track signal is used for the tracking servo. For a high stability of the tracking servo, the cross-track signal amplitude ratio has to be about 0.10 or more. For the track seek, the push-pull signal is used for the traverse count. For a stable track seek, the push-pull signal amplitude ratio has to be about 0.05 or more. Further, in case data has been pre-recorded as a train of pits on the optical disc, the pit modulation of the shortest pit should be about 0.08 or more for normal readings of the data.

Thus, in CD and MD, the spatial frequency of the track pitch is limited to within a range of a half to two/thirds of the cut-off frequency for the cross-track signal amplitude ratio to be 0.10 or more, push-pull signal amplitude ratio to be 0.05 or more and for the pit modulation of the shortest pit to be 0.08 or more.

However, the optical recording media are required to have a higher recording density. Namely, the optical discs are required to write data with a higher recording density. For a higher recording density of the optical recording media, the track pitch should be made smaller, for example. However, the conventional optical recording media are disadvantageous in that if the track pitch is made too smaller, signals necessary for the tracking servo and track seek cannot be produced to have sufficient level, respectively, so that the tracking servo and track, seek cannot be done stably.

Assume that a laser light used in reading data has a wavelength $\lambda$ of about 650 nm and an objective lens used has a numerical aperture NA of about 0.52. Then, in a conventional optical disc adapted for a tacking servo by the push-pull method, when it has a track pitch of 0.95 $\mu$m, the push-pull signal amplitude ratio will be about 0.14, which assures a sufficient signal amplitude, so that the tracking servo can be effected stably. However, if the track pitch is 0.70 $\mu$m, the push-pull signal amplitude ratio is about 0.03, which will not assure any sufficient signal amplitude, so that no stable tracking servo can be done. In addition, if data is pre-recorded as a train of pits on the optical disc, the track pitch of 0.70 $\mu$m will not provide any sufficient pit modulation.

Similarly, in a conventional optical disc adapted for a tracking servo by the three-spot method, when it has a track pitch of 0.95 $\mu$m, the cross-track signal amplitude ratio will be about 0.14, which assures a sufficient signal amplitude, so that the tracking servo can be effected stably. However, if the track pitch is 0.70 $\mu$m, the cross-track signal amplitude ratio is about 0.02, which will not assure any sufficient signal amplitude, so that no stable tracking servo can be done. In addition, if data is pre-recorded as a train of pits on the optical disc, the track pitch of 0.70 $\mu$m will not-provide any sufficient pit modulation.

OBJECT AND SUMMARY OF THE INVENTION

Accordingly, the present invention has an object to overcome the above-mentioned drawbacks of the prior art by providing an optical recording medium having recording tracks formed with a very small pitch, adapted for stable tracking servo and track seek as well as for a sufficient pit modulation, and thus capable of recording data with a high density.

The present invention has another object to provide a master for use to produce such an optical recording medium.

The present invention has a still another object to provide an optical recording/reproducing apparatus adapted to write and/or read data to and/or from such an optical recording medium.

The above object can be attained by providing an optical recording medium having a train,of pits formed along a recording track thereof and to and/or from which data is written and/or read by focusing thereon a light having a predetermined wavelength;

the train of pits being formed from first and second pit trains adjacent to each other, and the pits in one of the pit trains being different in depth from those in the other pit train; and the first and second pit trains being formed to meet following relations (1) and (2) or (3) and (4) on the assumption that:

the refractive index of a material extending from the light incident surface of the optical recording medium to a surface of the optical recording medium on which the pit trains are formed is n;

the wavelength of a light used to write and/or read data to and/from the optical recording medium is $\lambda$;

the depth of the pits in the first train is x;

the depth of the pits in the second train is y; the phase depth of the first pit train expressed by $x \times n/\lambda$ is X;

the phase depth of the second pit train expressed by $y \times n/\lambda$ is Y; and K, L, M and N are arbitrary integers, respectively:

$Y \geq 0.5M+073.0411-1098.4983(X-0.5K)+6584.7191(X-0.5K)^2-19632.4312(X-0.5K)^3+29119.8871(X-0.5K)^4-17190.8276(X-0.5K)^5$ (1)

$Y \leq 0.5M-27.1270+307.9548(X-0.5K)-1283.3732(X-0.5K)^2+2358.2052(X-0.5K)^3-1620.1442(X-0.5K)^4$ (2)

$Y \geq 0.5N-301.2370+2943.8278(X-0.5L)-10617.5544(X-0.5L)^2+16767.2625(X-0.5L)^3-9779.5969(X-0.5L)^4$ (3)

$Y \leq 0.5N+10822.3214-136377.6645(X-0.5L)+686724.6250(X-0.5L)^2-1727199.1853(X-0.5L)^3+2169848.4081(X-0.5L)^4-1089274.1768(X-0.5L)^5$ (4)

In the above optical recording medium, since the first and second pit trains different in pit depth from each other are formed to meet the relations (1) and (2) or (3) and (4), signals necessary for the tracking servo and track seek are be provided at sufficient levels, respectively, even with the track pitch made small. This optical recording medium will be referred to as "first optical recording medium" hereinunder for the convenience of the illustration and description of the present invention.

Also, the above object can be attained by providing a master for use to produce an optical recording medium having a train of pits formed along a recording track thereof and to and/or from which data is written and/or read by focusing thereon a light having a predetermined wavelength, the master having formed thereon:

concavity-convexity patterns for the pit trains of pits, formed for first and second ones of them to be adjacent to each other; and the first and second pit train patterns being formed to meet following relations (5) and (6) or (7) and (8) on the assumption that:

the refractive index of a material extending from the light incident surface of the optical recording medium to a surface of the optical recording medium on which the pit trains are formed is n;

the wavelength of a light used to write and/or read data to and/from the optical recording medium is $\lambda$;

the depth of the pits in the first train is x';

the depth of the pits in the second train is y';

the phase depth of the first pit train expressed by $x \times n/\lambda$ is X';

the phase depth of the second pit train expressed by $y \times n/\lambda$ is Y'; and K, L, M and N are arbitrary integers, respectively:

$Y' \geq 0.5M+73.411-1098.4983(X'-0.5K)+6584.7191(X'-0.5K)^2-19632.4312(X'-0.5K)^3+29119.8871(X'-0.5K)^4 17190.8276(X'-0.5K)^5$ (5)

$Y' \leq 0.5M-27.1270+307.9548(X'-0.5K)-1283.3732(X'-0.5K)^2+2358.2052(X'-0.5K)^3-1620.1442(X'-0.5K)^4$ (6)

$$Y \geq 0.5N - 301.2370 + 2943.8278(X'-0.5L) - 10617.5544(X'-0.5L)^2 + 16767.2625(X'-0.5L)^3 - 9779.5969(X'-0.5L)^4 \quad (7)$$

$$Y \leq 0.5N + 10822.3214 - 136377.6645(X'-0.5L) + 686724.6250(X'-0.5L)^2 - 1727199.1853(X'-0.5L)^3 + 2169848.4081(X'-0.5L)^4 - 1089274.1768(X'-0.5L)^5 \quad (8)$$

In the above master, since the first and second pit train patterns are formed to meet the relations (5) and (6) or (7) and (8), the master can be used to produce the optical recording medium having formed thereon the first and second pit trains which meet the relations (1) and (2) or (3) and (4). Therefore, signals necessary for the tracking servo and track seek are be provided at sufficient levels, respectively, even with the track pitch made small. This master will be referred to as "first maser" hereinafter for the convenience of the illustration and description of the present invention.

The above object can be attained also by providing an optical recording/reproducing apparatus adapted to write and/or read data to and/or from an optical recording medium having a train of pits formed along a recording track thereof and, to and/or from which data is written and/or read by focusing thereon a light having a predetermined wavelength; the train of pits being formed from first and second pit trains adjacent to each other, and the pits in one of the pit trains being different in depth from those in the other pit train, the apparatus comprising:

two photodetectors disposed symmetrically with respect to the track center of the optical recording medium;

a quantity of light reflected from the optical recording medium, detected by one of the two photodetectors being assumed to be A while that detected by the other photodetector is assumed to be B, a difference signal (A−B) indicative of a difference between the quantities A and B being used for a tracking servo to have a light spot track a recording track.

In this optical recording/reproducing apparatus, a sum signal (A+B) indicative of a sum of the quantities A and B is used for a track seek to move a light spot to a desired recording track. Note that the first optical recoding medium can preferably be used in this first optical recording/reproducing apparatus.

The first optical recording/reproducing apparatus is adapted to play the optical recording medium having formed thereon the pit trains different in pit depth from each other. With this optical recording medium, signals necessary for the tracking servo and track seek can be provided at sufficient levels, respectively, even with the track pitch made small. That is, playing an optical recording medium having the adjacent pit trains different pit depth from each other, the optical recording/reproducing apparatus according to the present invention can use the above-mentioned difference signal or push-pull signal to effect a tracking servo stably and use the above-mentioned sum signal or cross-track signal to effect a stable track seek, even with the small track pitch.

Also, the above object can be attained by providing an optical recording medium having a train of pits formed along a recording track thereof and to and/or from which data is written and/or read by focusing thereon a light having a predetermined wavelength;

the train of pits being formed from first and second pit trains adjacent to each other, and the pits in one of the pit trains being different in depth from those, in the other pit train; and the first and second pit trains being formed to meet following relations (13) and (14) or (15) and (16) on the assumption that:

the refractive index of a material extending from the light incident surface of the optical recording medium to a surface of the optical recording medium on which the pit trains are formed is n;

the wavelength of a light used to write and/or read data to and/from the optical recording medium is $\lambda$;

the depth of the pits in the first train is x;

the depth of the pits in the second train is y;

the phase depth of the first pit train expressed by $x \times n/\lambda$ is X;

the phase depth of the second pit train expressed by $y \times n/\lambda$ is Y; and K, L, M and N are arbitrary integers, respectively:

$$Y \geq 0.5M + 35.8289 - 569.0171(X-0.5K) + 3607.3326(X-0.5K)^2 - 11369.4693(X-0.5K)^3 + 17816.5986(X-0.5K)^4 - 11104.0253(X-0.5K)^5 \quad (13)$$

$$Y \leq 0.5M - 12.2807 + 148.0165(X-0.5K) - 669.8877(X-0.5K)^2 + 1466.8185(X-0.5K)^3 - 1589.1663(X-0.5K)^4 + 703.5593(X-0.5K)^5 \quad (14)$$

$$Y \geq 0.5N - 226.5608 + 1670.0195(X-0.5L) - 4087.700(X-0.5L)^2 + 3326.6228(X-0.5L)^3 \quad (15)$$

$$Y \leq 0.5N - 9579.2677 + 92165.2641(X-0.5L) - 2399.1612(X-0.5L)^2 + 532600.3255(X-0.5L)^3 - 319883.9178(X-0.5L)^4 \quad (16)$$

This optical recording medium will be referred to as "second optical recording medium" hereinafter for the convenience of the illustration and description of the present invention.

In the second optical recording medium, since the first and second pit trains different in pit depth from each other are formed to meet the relations (13) and (14) or (15) and (16), signals necessary for the tracking servo and track seek are be provided at sufficient levels, respectively, even with the track pitch made small.

The above object can be attained also by providing a master for use to produce an optical recording medium having a train of pits formed along a recording track thereof and to and/or from which data is written and/or read by focusing thereon a light having a predetermined wavelength, the master having formed thereon:

concavity-convexity patterns for the pit trains of pits, formed for first and second ones of them to be adjacent to each other; and the first and second pit train patterns being formed to meet following relations (17) and (18) or (19) and (20) on the assumption that:

the refractive index of a material extending from the light incident surface of the optical recording medium to a surface of the optical recording medium on which the pit trains are formed is n;

the wavelength of a light used to write and/or read data to and/from the optical recording medium is $\lambda$;

the of the pits in the first train is x';

the depth of the pits in the second train is y';

the phase depth of the first pit train expressed by $x' \times n/\lambda$ is X';

the phase depth of the second pit train expressed by $y' \times n/\lambda$ is Y'; and K, L, M and N, are arbitrary integers, respectively:

$$Y' \geq 0.5M + 35.8289 - 569.0171(X'-0.5K) + 3607.3326(X'-0.5K)^2 - 11369.469(X'-0.5K)^3 + 17816.5986(X'-0.5K)^4 - 11104.0253(X'-0.5K)^5 \quad (17)$$

$$Y' \leq 0.5M - 12.2807 + 148.0165(X'-0.5K) - 669.8877(X'-0.5K)^2 + 1466.8185(X'-0.5K)^3 - 1589.1663(X'-0.5K)^4 + 703.5593(X'-0.5K)^5 \quad (18)$$

$$Y' \geq 0.5N - 226.5608 + 1670.0195(X'-0.5L) - 4087.700(X'-0.5L)^2 +$$

$$3326.6228(X'-0.5L)^3 \quad (19)$$

$$Y'<0.5N-9579.2677+92165.2641(X'-0.5L)-332399.1612(X'-0.5L)^2+532600.3255(X'-0.5L)^3-319883.9178(X'-0.5L)^4 \quad (20)$$

This master will be referred to as "second master" hereunder for the convenience of the illustration and description of the present invention.

In this second master, since the first and second pit train patterns are formed to meet the relations (17) and (18) or (19) and (20), the master can be used to produce the optical recording medium having formed thereon the first and second pit trains which meet the relations (13) and (14) or (15) and (16). Therefore, signals necessary for the tracking servo and track seek are be provided at sufficient levels, respectively, even with the track pitch made small.

Also, the above object can be attained by providing an optical recording/reproducing apparatus adapted to write and/or read data to and/or from an optical recording medium having a train of pits formed along a recording track thereof and to and/or from which data is written and/or read by focusing thereon a light having a predetermined wavelength; the train of pits being led first and second pit trains adjacent to each other, and the pits in one of the pit trains being different in depth from those in the other pit train, the apparatus comprising:

two photodetectors disposed symmetrically with respect to the track center, of the optical recording medium;

a quantity of light reflected from the optical recording medium, detected by one of the two photodetectors being assumed to be A while that detected by the other photodetector is assumed to be B, a difference signal (A−B) indicative of a difference between the quantities A and B being used for a track seek to move a light spot to a desired recording track.

This optical recording/reproducing apparatus will be referred to as "second optical recording/reproducing apparatus" hereinafter for the convenience of the illustration and description of the present invention. In this optical recording/reproducing apparatus, a sum signal (A+B) indicative of a sum of the quantities A and B is used for a track seek to move a light spot to a desired recording track. Note that the second optical recoding medium can preferably be used in this second optical recording/reproducing apparatus.

The second optical recording/reproducing apparatus is adapted to play the optical recording medium having formed thereon the pit trains different in pit depth from each other. With this optical recording medium, signals necessary for the tracking servo and track seek can be provided at sufficient levels, respectively, even with the track pitch made small. That is, playing an optical recording medium having the adjacent pit trains different in pit depth from each other, the optical recording/reproducing apparatus according to the present invention can use the above-mentioned difference signal or push-pull signal to effect a tracking servo stably and use the above-mentioned sum signal or cross-track signal to effect a stable tack, even with the small track pitch.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

It should be reminded that the optical recording medium according to the present invention is an optical disc having data pre-recorded thereon as a train of pits.

Also it should be noted that the embodiments of the present invention which will be defined later will be described first as a first group of embodiments, and then the embodiments will be described as a second group.

It should further be noted that on the assumption that a quantity of light reflected from the optical disc, detected by one of two photodetectors disposed symmetrically with respect to the track center of the optical disc, is A while that detected by the other photodetector is B, a difference signal expressed by A−B will be referred as "push-pull" signal hereinafter and a sum signal expressed by A+B will be referred togas "cross-track" signal. Also note that taking as Mmax the value of the sum signal A+B at a mirror surface portion of the optical disc where no pit trains are formed, a value expressed by C/Mmax will be referred to as "push-pull signal amplitude ratio" hereinafter and a value expressed by D/Mmax will be referred to as "cross-track signal amplitude ratio".

First Group of Embodiments

<Optical Disc>

Figure 1:
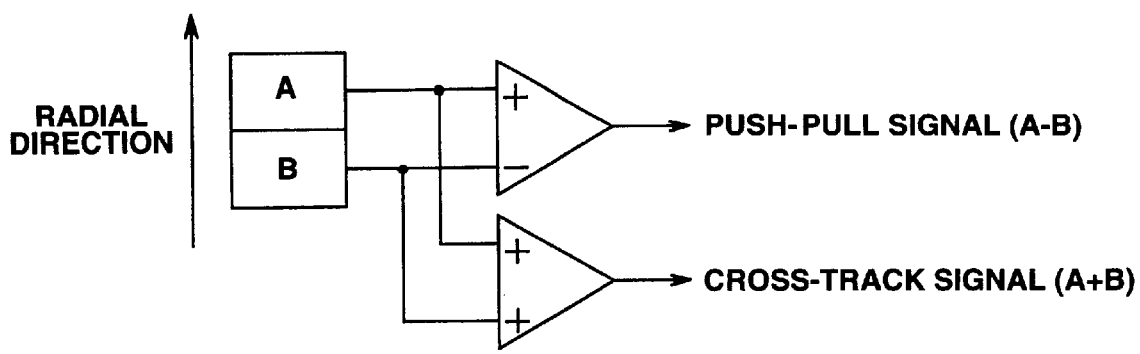
FIG. 1 shows how to detect a push-pull signal and cross-track signal.
Figure 2:
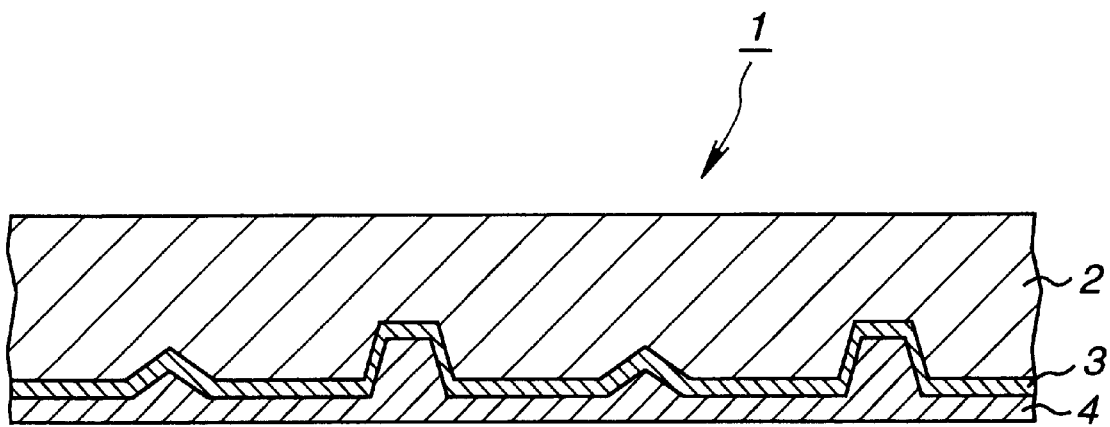
FIG. 2 is a fragmentary sectional view, enlarged in scale, of the essential portion of an embodiment of optical disc according to the present invention.

Referring now to FIG. 2, there is illustrated in the form of a sectional view, enlarged in scale, of the essential portion of a first embodiment of optical disc according to the present invention. The optical disc is generally indicated with a reference 1.

The optical disc 1 has data pre-recorded thereon in the form of a train of pits. The optical disc 1 comprises a substrate 2 made of polymethyl methacrylate (PMMA), polycarbonate (PC) or the like, a light reflective layer 3 made of aluminum (Al) or the like formed on the substrate 2, and a protective layer 4 formed on the light reflective layer 3 to protect the latter. The protective layer 4 has an ultraviolet-curable resin applied thereon by spin coating. Note that the present invention is not limited to this construction of the optical disc 1 from the light reflective layer 3 and protective layer 4.

Figure 3:
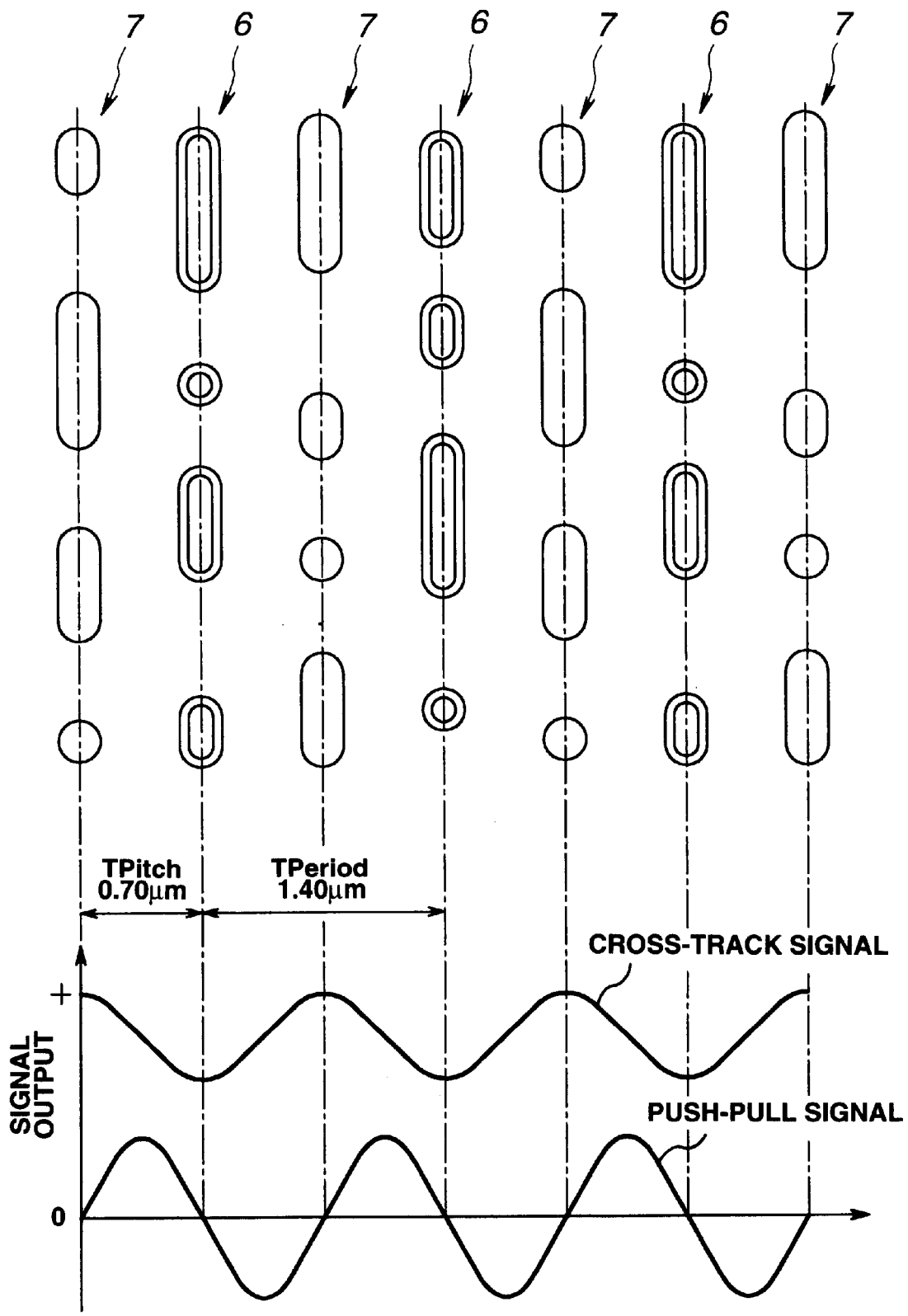
FIG. 3 is a plan view, enlarged in scale, of a portion of the recording area of the optical disc shown in FIG. 2.

FIG. 3 is a plane view, enlarged in scale, of a portion of the recording area of the optical disc 1 shown in FIG. 2. As shown, the disc substrate 2 has first pit trains 6 and second pit train 7 formed thereon adjacently to each other and alternately. The first pit train 6 and second pit train 7 are different in pit depth from each other. The first and second pit trains 6 and 7 are formed on the disc substrate 2 to delineate a double spiral. FIG. 3 also shows a relation between the first and second pitch trains 6 and 7 and cross-track and push-pull signals produced from the optical disc 1.

In the optical disc 1, tracks are formed with a pitch TPitch of 0.70 μm. The track pitch TPitch is equivalent to an interval between the center line of the first pit train 6 and that of the second pitch train 7. That is, the interval between the first and second pit trains is 0.70 μm.

The interval between the center lines of the neighboring first pit trains 6 or that between the center lines of the neighboring second pit trains 7 will be referred to as "track period TPeriod" hereinafter. The track period TPeriod is equivalent to double the track pitch TPitch. In this optical disc 1, the track period TPeriod is 1.40 μm.

In the optical disc 1 according to the present invention, the first pit train 6 and second put train 7 are formed to be different in pit depth from each other. More specifically, on the assumption that the phase depth of the first pit train 6 is taken as X while that of the second pit train 7 is taken as Y and K, L, M and N are arbitrary integers, respectively, the first and second pit trains 6 and 7 are formed to meet the following relations (1-1) and (1-2) or (1-3) and (1-4):

$Y \geq 0.5M + 73.0411 - 1098.4983(X-0.5K) + 6584.7191(X-0.5K)^2 - 19632.4312(X-0.5K)^3 + 29119.8871(X-0.5K)^4 - 17190.8276(X-0.5K)^5$ (1-1)

$Y \leq 0.5M - 27.1270 + 807.9548(X-0.5K) - 1283.3732(X-0.5K)^2 + 2358.2052(X-0.5K)^3 - 1620.1442(X-0.5K)^4$ (1-2)

$Y \geq 0.5N - 301.2370 + 2943.8278(X-0.5L) - 10617.5544(X-0.5L)^2 = 16767.2625(X-0.5L)^3 - 9779.5969(X-0.5L)^4$ (1-3)

$Y \leq 0.5N + 10822.3214 - 136377.6645(X-0.5L) + 686724.6250(X-0.5L)^2 - 1727199.1853(X-0.5L)^3 + 2169848.4081(X-0.5L)^4 - 1089274.1768(X-0.5L)^5$ (1-4)

Note that on the assumption that the refractive index of a material extending from the light incident surface of the optical disc 1 to a surface of the optical disc 1 on which the pit trains are formed is n, the phase depth X of the first pit train 6 is expressed by $x \times n/\lambda$ where x is the pit depth of the first pit train. Also, the phase depth Y of the second pit tram 7 is expressed by $y \times n/\lambda$ where y is the pit depth of the second pit train 7.

In the optical disc 1 mentioned above, since the first and second pit trains 6 and 7 are formed to meet the relations (1-1) and (1-2) or (1-3) and (1-4), signals necessary for the tracking servo and track seek can be produced at sufficient levels, respectively, as will be evident from the results of experiments which will be given later.

Further in this optical disc 1, since the levels and polarities of the push-pull and cross-track signals vary as shown in FIG. 3, neighboring recording tracks can be discriminated from each other by detecting the levels and polarities of the push-pull, and cross-track signals during track seek.

Further in this optical disc 1, since the first and second pit trains 6 and 7 are formed to meet the relations (1-1) and (1-2) or (1-3) and (1-4), a sufficient pit modulation can be provided to stably reproduce a signal.

<Laser Cutting Apparatus>

Figure 4:
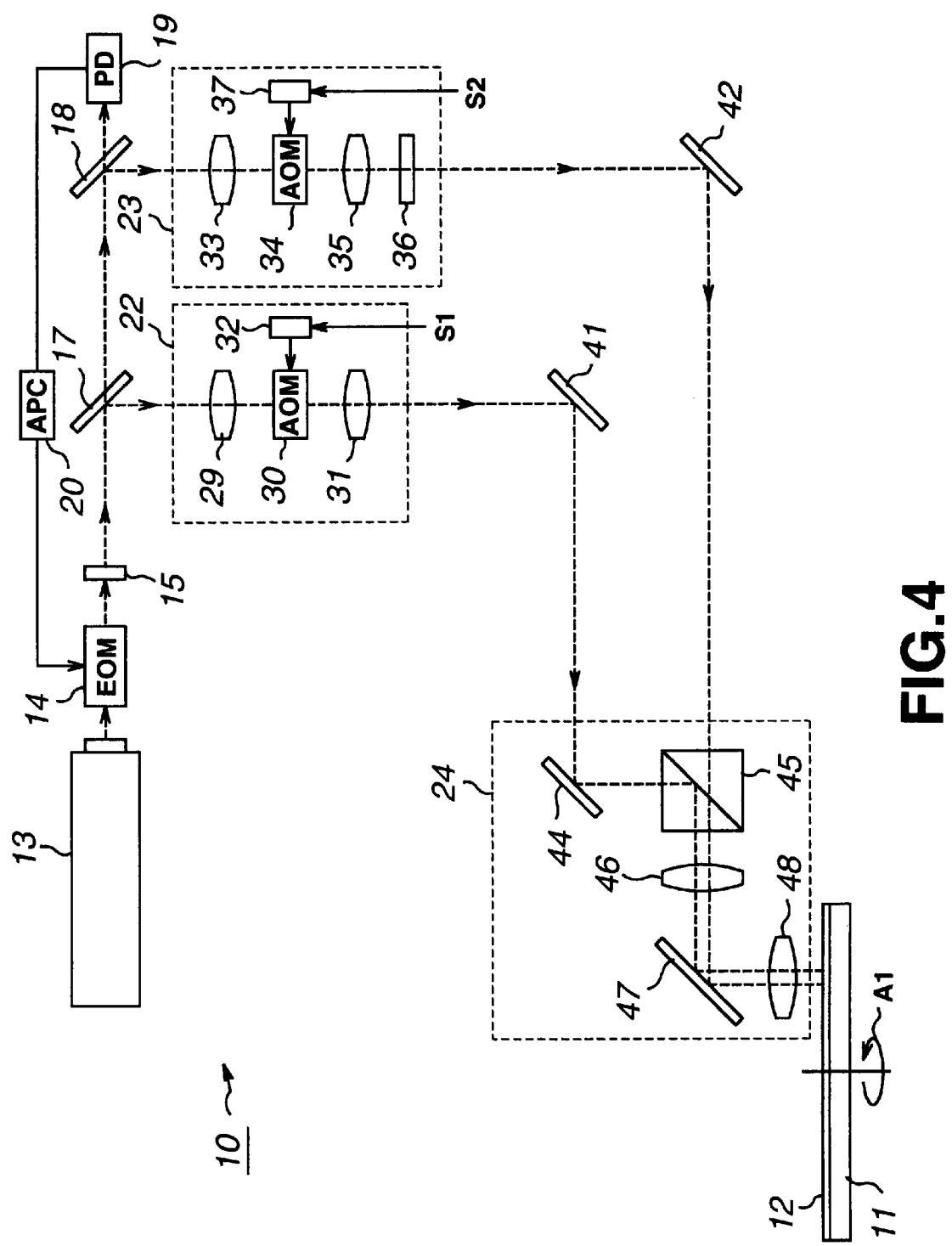
FIG. 4 schematically shows the optical system of a laser cutting apparatus used to produce the optical disc according to the present invention and to prepare a maser for used to produce the optical disc.

In the production of the aforementioned optical disc 1, a laser cutting apparatus is used to prepare an optical recording medium maser for use to produce the optical disc 1. An example of the laser cutting apparatus for use to prepare a master for optical recording medium will be described in detail herebelow with reference to FIG. 4 schematically showing the optical system of the laser cutting apparatus. The laser cutting apparatus is generally indicated with a reference 10.

The laser cutting apparatus 10 is intended for exposure, to laser light, of a photoresist 12 applied to a glass substrate 11 to form a latent image in the photoresist 12. For forming the latent image in the photoresist 12, the glass substrate 11 on which the photoresist 12 is applied is mounted on a rotation drive provided a moving optical table. For exposure of the photoresist 12 to the laser light, the glass substrate 11 is rotated by the rotation drive in the direction of arrow A1 while being translated by the moving optical table so that the entire surface of the photoresist 12 is exposed to the laser light in a predetermined pattern.

The cutting apparatus 10 is adapted for exposure of the photoresist 12 to two exposure laser beams, to thereby forming, by the respective exposure beams, a latent image corresponding to the first pit train 6 and a one corresponding to the second pit train 7. That is, the laser cutting apparatus 10 forms the latent image corresponding to the first pit train 6 by the first exposure beam and the latent image corresponding to the second pit train 7 by the second exposure beam.

As will be seen from FIG. 4, the laser cutting apparatus 10 comprises a light source 13 to generate a laser light, an electro-optical modulator (EOM) 14 to adjust the intensity of the laser light from the light source 13, a analyzer 15 disposed on the optical axis of a laser light going out of the EOM 14, a first beam splitter 17 to separate the laser light having been transmitted through the analyzer 15 into a reflected light and transmitted light, a second beam splitter 18 to separate the laser light having been transmitted through the first beam splitter 17 into a reflected light and transmitted light, a photodetector (PD) 19 to detect the laser light having been transmitted through the second beam splitter 18, and an auto power controller (APC) 20 to adjust-the intensity of the laser light going out of the EOM 14 by applying a signal electric field to the EOM 14.

More specifically, in the laser cutting apparatus 10, the laser light going out of the light source 13 is first adjusted to have a predetermined intensity by the EOM 14 which is driven with a signal electric field applied from the APC 20, and then incident upon the analyzer 15. The analyzer 15 allows only an S-polarized light to pass through it. Namely, the laser light having been transmitted through the analyzer 15 is an S-polarized light.

Note that the light source 13 may be an arbitrary one but should preferably be a one which can generate a laser light having a relatively short wavelength. More particularly, the light source 13 should preferably be, for example, a Kr laser which generates a laser light having a wavelength λ of 413 nm or a He—Cd laser which generates a laser light having a wavelength λ of 442 nm.

The S-polarized laser light has been transmitted through the analyzer 15 is first separated by the first beam splitter 17 into a reflected light and transmitted light. The laser light having passed through the first beam splitter 17 is further separated by the second beam splitter 18 into a reflected light and transmitted light. Note that in the laser cutting apparatus 10, the laser light reflected by the first beam splitter 17 is used as a first exposure beam while the laser light reflected by the second beam splitter 18 is used as a second exposure beam.

The laser light having passed through the second beam splitter 18 has the intensity thereof detected by the PD 19, and a signal corresponding to the light intensity is sent from the PD 19 to the APC 20. According to the signal from the PD 19, the APC 20 adjusts the signal electric field for application to the EOM 14 so that the light intensity detected by the PD 19 becomes constant at a predetermined level. Namely, the APC 20 provides an automatic power control under which the laser light going out of the EOM 14 has a constant intensity, thus the laser light becomes stable with less noise.

Further the laser cutting apparatus 10 comprises a first modulation optical system 22 to modulate the light intensity of the laser light reflected by the first beam splitter 17, a second modulation optical system 23 to modulate the light intensity of the laser light reflected by the second beam splitter 18, and an optical system 24 to re-combine together the laser beams having the intensity thereof modulated by the first ad second modulation optical systems 22 and 23, respectively, to focus th re-combined light beams onto the photoresist 12.

The first exposure beam from the first beam splitter 17 is guided to the first modulation optical system 22 by which its intensity is modulated. Similarly, the second exposure beam from the second beam splitter 18 is guided to the second modulation optical system 23 by which its intensity is modulated.

More specifically, the first exposure beam incident upon the first modulation optical system 22 is condensed by a condenser lens 29 and incident upon an acousto-optical modulator (AOM) 30 by which the first exposure beam has the intensity thereof modulated to correspond to a desired exposure pattern. Note that the AOM 30 should preferably be a one made of tellurium oxide (TeO$_2$), for example. The first exposure beam having the intensity thereof modulated by the AOM 30 is collimated by a collimator lens 31 to be a parallel light which will go out of the first modulation optical system 22.

The AOM 30 is provided with a driver 31 to drive the AOM 30. For exposing the photoresist 12 to the laser light, a signal S1 corresponding to a desired exposure pattern is supplied to the driver 32. The AOM 30 is driven by the driver 32 according to the signal S1 to modulate the intensity of the second exposure beam correspondingly.

More specifically, for forming in the photoresist 12 a latent image corresponding to the first pit train 6, for example, a signal modulated correspondingly to the first pit train 6 is supplied to the driver 32 which in turn will drive the AOM 30 according to the supplied signal. Thereby, the first exposure beam is modulated in intensity correspondingly to the desired first pit train 6.

Also, the second exposure beam incident upon the second modulation optical system 23 is condensed by a condenser lens 33 and incident upon an acousto-optical modulator (AOM) 34 by which the second exposure beam is modulated in intensity correspondingly to a desired exposure pattern. Note that the AOM 34 should preferably be a one made of tellurium oxide (TeO$_2$), for example. The second exposure beam having been adjusted in intensity by the AOM 34 is collimated by a collimator lens 35 to be a parallel beam and passed through a $\lambda/2$ wavelength plate 36 to have the polarized direction thereof turned 90 deg., and then goes out of the second modulation optical system 23.

The AOM 34 is provided with a driver 37 to drive the AOM 34. For exposing the photoresist 12 to the laser light, a signal S2 corresponding to a desired exposure pattern is supplied to the driver 37. The AOM 34 is driven by the driver 37 according to the signal S2 to modulate the intensity of the second exposure beam correspondingly.

More specifically, for forming in the photoresist 12 a latent image corresponding to the second pit train 7, for example, a signal modulated correspondingly to the second pit train 7 is supplied to the driver 37 which in turn will drive the AOM 34 according to the supplied signal. Thereby, the second exposure beam is modulated in intensity correspondingly to the desired second pit train 7.

As in the above, the first exposure beam is modulated in intensity by the first modulation optical system 22, and the second exposure beam is modulated in intensity by the second modulation optical system 23. Note that the first exposure beam going out of the first modulation optical system 22 remains as the S-polarized one while the second exposure beam going out of the second modulation optical system 23 is a P-polarized one since it has been transmitted through the $\lambda/2$ wavelength plate 36 to have the polarized direction thereof turned 90 deg.

The first exposure beams from the first modulation optical system 22 is reflected by a mirror 41 and guided to the moving optical table horizontally and in parallel. Thereafter, it is reflected by a mirror 44 and incident upon a polarization beam splitter 45. On the other hand, the second exposure beam from the modulation optical system 32 is reflected by a mirror 42 and guide to the moving optical table horizontally and in parallel, and incident as it is upon the polarization beam splitter 45.

The polarization beam splitter 45 is adapted to reflect the S-polarized light and allows the P-polarized light to pass through it. Since the first exposure beam from the first modulation optical system 22 is an S-polarized light, it is reflected by the popularization splitter 45. On the other hand, since the second exposure beam from the second modulation optical system 23 is a P-polarized light, it is allowed to pass through the polarization beam splitter 45. Thereby, the first exposure beam from the first modulation optical system 22 and second exposure beam from the second modulation optical system 23 are re-combined together to have the same traveling direction.

The first and second exposure beams re-combined to have the same traveling direction and going out of the polarization optical system 45 are magnified by a magnifier lens 46 to have a predetermined diameter, reflected by a mirror 47, and then guide to an objective lens 48 which will focus them onto the photoresist 12. Thus, a latent image will be formed in the photoresist 12. At this time, the glass substrate 11 having the photoresist 12 applied thereon is rotated by the rotation drive in the direction of arrow A1 while being translated by the moving optical table so that the entire surface of the photoresist 12 is exposed to the exposure beams in a desired pattern as having previously been described. As a result, a latent image corresponding to the irradiation traces of the first and second exposure beams will be formed on the entire surface of the photoresist 12.

The objective lens 48 to focus the exposure beams onto the photoresist 12 should preferably have a large numerical aperture NA to form a finer pit train pattern, and more particularly, a numerical aperture NA of about 0.9.

During irradiation of the first and second exposure beams onto the photoresist 12, the diameters of the first and second exposure beams are changed as necessary by the magnifier lens 46 to adjust the numerical aperture NA of the objective lens 48. Thereby it is made possible to change the spot diameter of the first and second exposure beams focused on the surface of the photoresist 12.

The first exposure beam incident upon the polarization beam splitter 45 is re-combined with the second exposure beam at the reflecting surface of the polarization beam splitter 45. To this end, the polarization beam splitter 45 is disposed for the reflecting surface thereof to form an appropriate angle of reflection in relation to the traveling direction of the beams recombined at the reflecting surface and going out of the polarization beam splitter 45.

In particular the angle of reflection of the reflecting surface of the polarization beam splitter 45 is set such that the distance, extending radially of the glass substrate 11, between spots of the first and second exposure beams corresponds to the track pitch TPitch. Thus a portion of the glass substrate 11 corresponding to the first pit train 6 is exposed to the first expose beam, while a portion corresponding to the second pit train 7 is exposed to the second exposure beam.

Since the laser cutting apparatus 10 has the optical system for the first exposure beam used to form a latent image for the first pit train 6, and the optical system for the second exposure beam used to form a latent image for the second pit train 7. Therefore a latent image for the first pit train 6 and a one for the second pit train 7 can be formed together only by the laser cutting apparatus 10. Furthermore, the laser cutting apparatus 10 can easily adjust the focused positions of the first and second exposure beams, respectively, by adjusting the direction of the polarization beam splitter 45 which re-combines the first and second exposure beams together.

<Method of Manufacturing the Optical Disc>

Next, the method of manufacturing the optical disc 1 shown in FIGS. 2 and 3 will be described in further detail concerning a concrete example thereof.

For manufacturing the optical disc 1, first a master for manufacture of an optical recording medium is prepared which has a convexity-concavity pattern corresponding to the first and second pit trains 6 and 7.

In the mastering process, first the disc-like glass substrate 11 having the surface thereof polished is washed and dried. Then, the glass substrate 11 is applied thereon with the photoresist 12. Next, the photoresist 12 is exposed to the exposure beams in the laser cutting apparatus 10 to form in the photoresist 12 latent images for the first and second pit trains 6 and 7, respectively.

It should be noted that for preparation of an evaluation optical disc which will be described later, a Kr laser which can generate a laser light of 413 nm in wavelength $\lambda$ was used as the light source 13 in the laser cutting apparatus 10, an objectives having a numerical aperture NA of 0.9 was used as the objective lens 48 to focus the first and second exposure beams onto the photoresist 12, and that a magnifier lens having a focal distance of 70 mm was used as the magnifier lens 46.

By exposure of the photoresist 12 to the exposure beams in the laser cutting apparatus 10, the latent images for the first and second pit trains 6 and 7 are formed in the photoresist 12.

For forming the latent image for the first pit train 6 by exposing the photoresist 12 to the first exposure beam, the first exposure beam is modulated in intensity by the first modulation optical system 22. More particularly, a signal modulated correspondingly to the first pit train 6 is supplied to the driver 32, the driver 32 drives the AOM 30 based on the supplied signal, and thus the AOM 30 modulates the intensity of the first exposure beam correspondingly to the first pit train 6. The first exposure beam thus modulated in intensity is focused onto the photoresist 12 through the objective lens 48. The photoresist 12 is thus exposed to the first exposure beam and has formed therein a latent image for the first pit train 6.

Simultaneously with the exposure of the exposure of the photoresist 12 to the first exposure beam, the photoresist 12 is exposed to the second exposure beam and has formed therein a latent image for the second pit train 7.

For forming the latent image for the second pit train 7 by exposing the photoresist 12 to the second exposure beam, the second exposure beam is modulated in intensity by the second modulation optical system 23. More particular, a signal modulated correspondingly to the second pit train 7 is supplied to be driver 37, the driver 37 drives the AOM 34 based on the supplied signal, and thus the AOM 34 modulates the intensity of the second exposure beam correspondingly to the second pit train 7. The second exposure beam thus modulated in intensity is focused onto the photoresist 12 through the objective lens 48. The photoresist 12 is thus exposed to the second exposure beam and has formed therein a latent image for the second pit train 7.

When forming the latent images for the first and second pit trains 6 and 7, respectively, by exposing the photoresist 12 to the first and second exposure beams, respectively, the glass substrate 11 having the photoresist 12 applied thereon is rotated at a predetermined speed while being translated at a predetermined speed.

More particularly, when preparing the evaluation optical disc which will be described later, the glass substrate 11 is rotated at such a speed that the light spots defined by the first and second exposure beams are moved at a linear velocity of 1.0 m/sec in relation to the photoresist 12. Each time the glass substrate 11 is rotated one full turn, it is translated by 1.40 $\mu$m (that is, track period TPeriod) radially thereof by the moving optical table.

By exposing the photoresist 12 to the first and second exposure beams as in the foregoing, the latent image for the first pit train 6 and that for the first pit train 7 are formed in the form of a double spiral in the photoresist 12.

For exposure of the photoresist 12 to the first and second exposure beams as in the above, the signals for supply to the drivers 32 and 37, respectively, are adjusted in level for the first and second exposure beams to have different powers, respectively. Thus, the latent image for the first pit train 6 will be different in depth from the latent image for the second pit train 7.

In the laser cutting apparatus 10, the angle of reflection of the reflecting surface of the polarization beam splitter 45 is set such that the distance, extending radially of the glass substrate 11, between the light,spots defied by the first and second exposure beams, respectively, corresponds to the track pitch TPitch.

Thanks to the above set angle of reflection of the reflecting surface of the polarization beam splitter 45, the latent image for the first pit train 6 will be formed by the first exposure beam and the latent image for the second pit train 7 will be formed by the second exposure beam. In other words, the first and second pit trains 6 and 7 can be positioned relatively to each other by adjusting the direction of the polarization beam splitter 45.

After forming the latent images in the photoresist 12, the glass substrate 11 is mounted on the developing turntable in such a manner that the side, thereof on which the photoresist 12 is applied is upside. The photoresist 12 is developed by dripping a developer onto the photoresist 12 while the glass substrate 11 is being rotated by turning the turntable, thereby forming concavity-convexity patterns for the first and second pit trains 6 and 7, respectively, on the glass substrate 11.

Next, a conductive layer of Ni or the like is formed on the concavity-convexity patterns by electroless plating. After that, the glass substrate 11 on which the conductive layer is formed is mounted on an electroforming apparatus, and a metal layer of Ni or the like is formed on the conductive layer by electroplating to a thickness of about 300±5 µm. Then, the metal layer is separated, and the separated metal layer is washed in acetone or the like. The photoresist 12 remaining on the side of the metal layer on which the concavity-convexity patterns are replicated is removed.

After completion of the above process, a master for manufacture of optical recording medium is provided which is a metal plate having replicated therein the concavity-convexity pattern formed on the glass substrate 11. Namely, a master is finished which has formed thereon a first pit train pattern for the first pit train 6. and a second pit train pattern for the second pit train 7.

This master is the master for, manufacture of the optical recording medium according to the present invention. Namely, the master is used to manufacture the optical disc 1 having the first and second pit trains 6 and 7 formed along the recording tracks. In the master, the first pit train pattern being a concavity-convexity pattern for the first pit train 6 and the first pit train pattern being a convexity pattern for the second pit train 7, are formed in the form of a double spiral. Also, the first and second pit train patterns are formed to be different in pit depth from each other.

Next, at a replicating process, the photopolymer (so-called 2P) method is adopted to prepare a disc substrate having replicated thereon a surface shape of the above-mention master for manufacture of optical recording medium.

More specifically, a photopolymer is evenly applied to the master on the side thereof on which the concavity-convexity patterns are formed, to form a photopolymer layer. Next, a base plate is closely attached on the photopolymer later with care for no bubble or dust to enter into the photopolymer layer. The base plate used here is a 1.2 mm-thick polymethyl methacrylate (of which the refractive index is 1.49).

Thereafter, ultraviolet rays are irradiated to the photopolymer layer which will be cured. Then, the master is separated from the base plate. The disc substrate 2 is thus made which has replicated thereon the surface shape of the master.

Note that although the 2P method was adopted to produce the disc substrate 2 so that the concavity-convexity patterns formed on the master could accurately be replicated to the disc substrate 2 a transparent resin such as polymethyl methacrylate or polycarbonate may of course be used to make the disc substrate 2 by injection molding of the resin for the purpose of a mass production.

Next, at a layer forming process, the light reflective layer 3 and protective layer 4 are formed on the disc substrate 2 having replicated thereon the surface shape of the maser. More specifically, the light reflective layer 3 of Al, for example, is formed by evaporation on the side of the disc substrate 2 on which the concavity-convexity pattern is formed, and then an ultraviolet-curable resin is applied to the light reflective layer 3 by spin coating. Ultraviolet rays are irradiated to the ultraviolet-curable resin. The latter is thus cured to form the protective layer 4.

With the above processes, the optical disc 1 is completed.
<Evaluation of the Optical Disc>

Next, there will be described herebelow the results of an evaluation effected on a plurality of evaluation optical discs prepared by the aforementioned manufacturing method and whose first and second pit trains 6 and 7 are different in pit depth from each other. Note that in the following description, the first pit train 6 includes deep pits while the second pit train 7 includes shallow pits.

Note that the pit depth of the first and second pit trains was controlled by changing the power of the first and second exposure beams or changing the thickness of the photoresist formed on the glass substrate, during preparation of the optical recording medium manufacturing master.

For evaluation of the evaluation optical discs, the first exposure beam used to form the latent image for the first pit train and the second exposure beam used to form the latent image for the second pit train were changed in power or the thickness of the photoresist formed on the glass substrate was changed, to produce a plurality of optical recording medium manufacturing masters having formed thereon the first and second pit train patterns different in pit depth from each other. The masters were used to make evaluation optical discs, respectively, using the 2P method. Note that each of the evaluation optical discs had a disc substrate thereof made of ploymethyl methacrylate of 1.49 in refractive index n.

Figure 5:
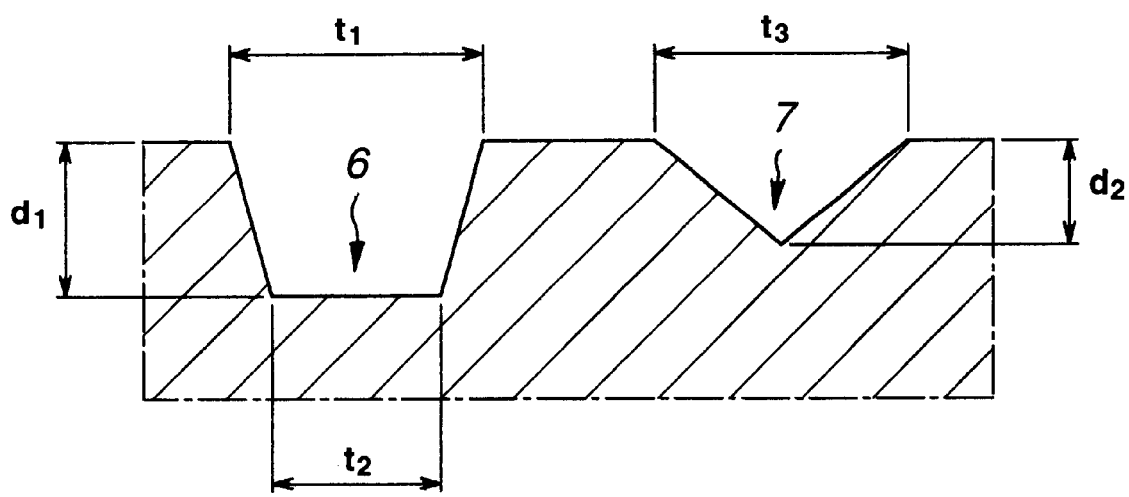
FIG. 5 is a fragmentary sectional view of an evaluation optical disc, showing pits formed in the optical disc.

FIG. 5 is a fragmentary sectional view of an evaluation optical disc, showing pits formed in the optical disc.

It should be noted that other parameters of sectional shape, than the pit, depth, of the first and second pit trains 6 and 7 were generally the same for all the evaluation optical discs. More specifically, in each of the evaluation optical discs, the deep pits in the first pit train 6 were formed to have a top width t1 of about 300 nm and bottom width t2 of about 200 nm, while the shallow pits in the second pit train 7 were formed to have a V-shaped section whose top width t3 is about 300 nm, as shown in FIG. 5. Also, in each of the evaluation optical disc, the first pit train 6 has a pit depth d1 and the second pit train 7 has a pit depth d2. The pit depth d1 is different from d2 as will be evident from FIG. 5.

The evaluation optical discs had recorded two-eight (2-8) modulated random patterns as the first and second pit trains 6 and 7 so that the first and second pit trains 6 and 7 had a duty ratio of about 50% between them.

The plurality of evaluation optical discs thus prepared were evaluated as to their tracking servo and track seek characteristics and measured concerning their push-pull and cross-track signal amplitude ratios obtained from the evaluation optical discs. Also, the evaluation optical discs were measured as to the pit modulation of the shortest pit (2T pit). For these evaluation and measurement, an optical pickup was used in which the wavelength λ of the laser light used was 650 nm and the numerical aperture NA of the objective lens used was 0.52.

The measured push-pull and cross-track signal amplitude ratios and pit modulation are shown along with the pit depth of each of the pit trains formed on the evaluation optical discs in Tables 2 and 3.

TABLE 2

| Pit depth in nm | | Push-pull signal | Cross-track signal | Pit modulation | |
|---|---|---|---|---|---|
| First pit train | Second pit train | amplitude ratio | amplitude ratio | First pit train | Second pit train |
| 144 | 62 | 0.293 | 0.234 | 0.173 | 0.081 |
| 144 | 72 | 0.292 | 0.194 | 0.171 | 0.093 |
| 144 | 87 | 0.280 | 0.138 | 0.169 | 0.110 |
| 144 | 108 | 0.242 | 0.072 | 0.167 | 0.139 |

TABLE 2-continued

| Pit depth in nm | | Push-pull signal | Cross-track signal | Pit modulation | |
|---|---|---|---|---|---|
| First pit train | Second pit train | amplitude ratio | amplitude ratio | First pit train | Second pit train |
| 144 | 117 | 0.222 | 0.053 | 0.166 | 0.147 |
| 144 | 124 | 0.206 | 0.042 | 0.165 | 0.152 |
| 130 | 60 | 0.220 | 0.292 | 0.192 | 0.081 |
| 130 | 67 | 0.223 | 0.266 | 0.191 | 0.089 |
| 130 | 72 | 0.223 | 0.245 | 0.190 | 0.095 |
| 130 | 108 | 0.180 | 0.123 | 0.185 | 0.133 |
| 130 | 130 | 0.134 | 0.087 | 0.183 | 0.147 |
| 163 | 66 | 0.345 | 0.130 | 0.136 | 0.080 |
| 163 | 72 | 0.343 | 0.103 | 0.136 | 0.089 |
| 163 | 87 | 0.329 | 0.050 | 0.134 | 0.113 |

TABLE 3

| Pit depth in nm | | Push-pull signal | Cross-track signal | Pit modulation | |
|---|---|---|---|---|---|
| First pit train | Second pit train | amplitude ratio | amplitude ratio | First pit train | Second pit train |
| 173 | 67 | 0.350 | 0.067 | 0.113 | 0.080 |
| 173 | 71 | 0.350 | 0.051 | 0.112 | 0.087 |
| 173 | 100 | 0.210 | 0.055 | 0.107 | 0.139 |
| 173 | 173 | 0.144 | 0.092 | 0.106 | 0.154 |
| 186 | 82 | 0.325 | 0.052 | 0.085 | 0.106 |
| 186 | 87 | 0.318 | 0.069 | 0.086 | 0.115 |
| 186 | 108 | 0.272 | 0.142 | 0.087 | 0.145 |
| 186 | 144 | 0.174 | 0.177 | 0.090 | 0.165 |
| 186 | 186 | 0.110 | 0.133 | 0.087 | 0.148 |
| 191 | 108 | 0.258 | 0.159 | 0.080 | 0.145 |
| 191 | 144 | 0.158 | 0.200 | 0.083 | 0.165 |
| 191 | 173 | 0.102 | 0.175 | 0.082 | 0.156 |
| 108 | 72 | 0.100 | 0.264 | 0.194 | 0.093 |
| 165 | 165 | 0.158 | 0.057 | 0.125 | 0.145 |
| 197 | 131 | 0.185 | 0.206 | 0.080 | 0.168 |

Note that the that although Tables 2 and 3 show the pit depth of the pit trains formed on the evaluation optical discs, the pit depth values were actually obtained by using an atomic force microscope (AFM) to measure the pit train patterns formed on the optical recording medium manufacturing master, not by measuring the evaluation optical discs themselves. That is to say, on the assumption that the pit train patterns formed on the master would be replicated to the disc substrate with a high accuracy, the results of measurement of the pit train patterns formed on the master were used as values which indicate the sectional shapes of the pit trains in the evaluation optical discs.

Each of the evaluation optical discs was determined as to the tracking servo and track seek characteristics as well as to the relation between the push-pull and cross-track signal amplitude ratios, resulted when the push-pull method was used. As the results reveal, when the push-pull signal amplitude ratio is 0.10 or more, the tracking servo could stably be effected using the push-pull signal. When the push-pull signal amplitude ratio was 0.10 or more and cross-track signal amplitude ratio was 0.05 or more, the track seek could stably be effected with each recording track identified by detecting the level and polarity of each of the push-pull and cross-track signals. As known from this fact, the tracking servo and track seek can be effected on an optical disc designed for a push-pull signal amplitude ratio of 0.10 or more and a cross-track signal amplitude ratio of 0.05 or more. Also, it was found that when the pit modulation was 0.08 or more, signal could be reproduced with a sufficiently low error rate.

In this situation, the pit depth of the first pit train 6 and that of the second pit train 7 were measured when the push-pull signal amplitude ratio was 0.10 or more, cross-tracks signal amplitude ratio was 0.05 or more and pit modulation was 0.08 or more.

Figure 6:
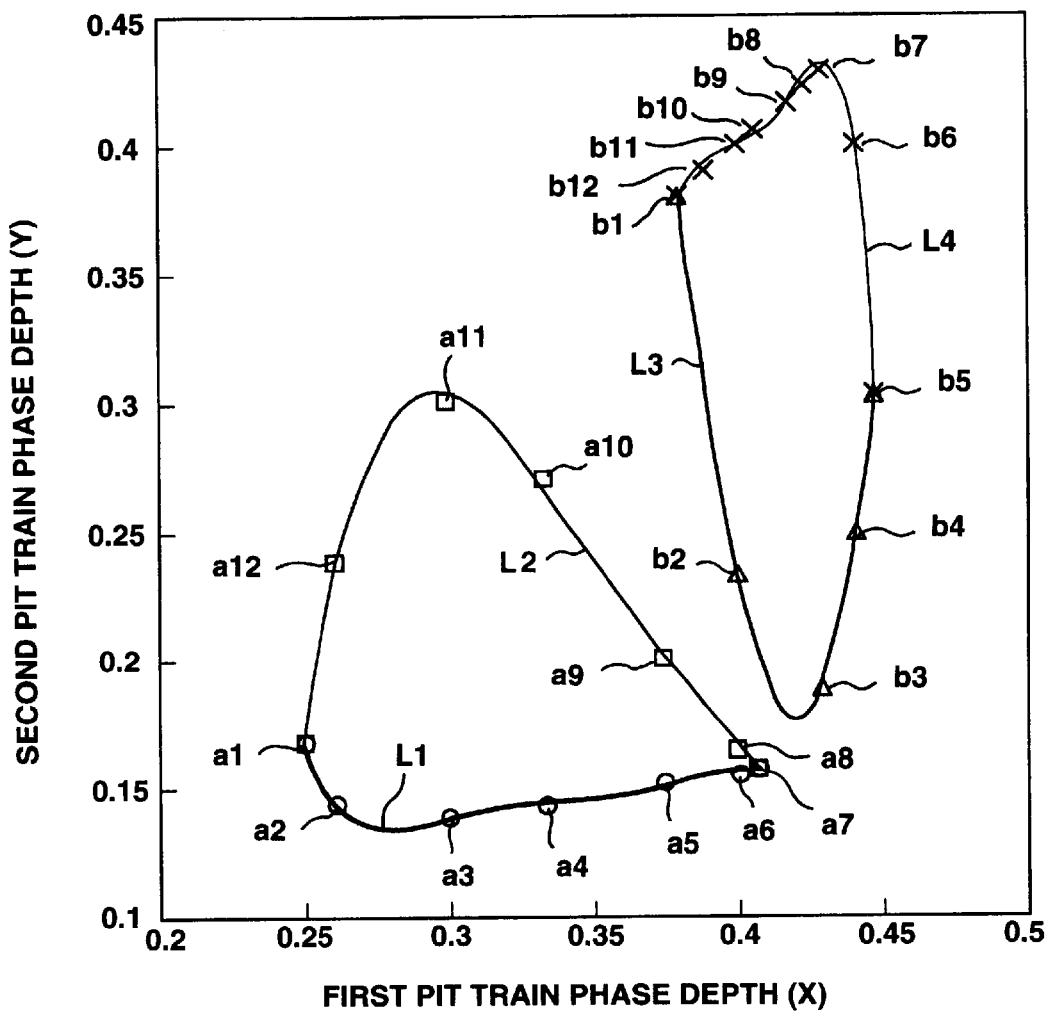
FIG. 6 graphically shows measured pit depth of each of first and second pit trains when the push-pull signal amplitude is 0.10 or more, cross-track signal amplitude is 0.05 or more and pit modulation is 0.08 or more.

FIG. 6 graphically shows the measured pit depth of each of the first and second pit trains. It was found from the measurement results that within a region defined by points a1, a2, a3, a4, a5, a6, a7, a8, a9, a10, a11 and a12 in FIG. 6 or within a region defined by points b1, b2, b3, b4, b5, b6, b7, b8, b9, b10, b11 and b12 in FIG. 6, the push-pull signal amplitude ratio is 0.10 or more, cross-track signal amplitude ratio is 0.05 or more and pit modulation is 0.08 or more.

In FIG. 6, the phase depth X of the first pit train (including the deep pits) is taken along the horizontal axis while the phase depth Y of the second pit train (including the shallow pits) is along the vertical axis.

A nearly linear line L1 connecting the points a1, a2, a3, a4, a5, a6 and a7 in FIG. 6 is expressed by a following relation (2-1), and a nearly linear line L2 connecting the points a7, a8, a9, a10, a11, a12 and a1 is expressed by a following relation (2-2):

$$Y = +73.0411 - 1098.4983X + 6584.7191X^2 - 19632.4312X^3 + 29119.8871X^4 - 17190.8276X^5 \quad (2\text{-}1)$$

$$Y = -27.1276 + 307.9548X - 1283.3732X^2 + 2358.2052X^3 - 1620.1442X^4 \quad (2\text{-}2)$$

Therefore, the region defined by the points a1 to a1 to a12 can approximately be expressed by following relations (2-4) and (2-5):

$$Y \geq +73.0411 - 1098.4983X + 6584.7191X^2 - 19632.4312X^3 + 29119.8871X^4 - 17190.8276X^5 \quad (2\text{-}3)$$

$$Y \leq -27.1270 + 307.9548X - 1283.3732X^2 + 2358.2052X^3 - 1620.1442X^4 \quad (2\text{-}4)$$

Namely, on the assumption that the phase depth of the first pit train 6 including the deep pits is X and that of the second pit train 7 including the shallow pits is Y, when these pit trains are formed to meet the above relations (2-3) and (2-4), the push-pull signal amplitude ratio is 0.10 or more, cross-track signal amplitude ratio is 0.05 or more and pit modulation is 0.08 or more, which assures stable tracking servo, track seek and signal reproduction.

The principle of light diffraction is such that within a coherent length, the same diffraction effect will take place at every integral multiple of a wavelength. Therefore, even if an optical path along which a light is incident upon a pit train and it travels back is increased or decreased in units of an integral multiple of a wavelength, a similar diffraction effect will take place. Namely, even with the phase depths X and Y of the pit trains increased or decreased in units of an integral multiple of a half wavelength, a similar diffraction effect will take place. Therefore, arbitrary integers M and K can be used to generalize the relations (2-3) and (2-4) like following relations (2-5) and (2-6):

$$Y \geq 0.5M + 73.0411 - 1099.4983(X - 0.5K) + 6584.7191(X - 0.5K)^2 - 19632.4312(X - 0.5K)^3 + 29119.8871(X - 0.5K)^4 - 190.9276(X - 0.5K)^5 \quad (2\text{-}5)$$

$$Y \leq 0.5M - 27.1270 + 307.9548(X - 0.5K) - 1283.3732(X - 0.5K)^2 + 2358.2052(X - 0.5K)^3 - 1620.1442(X - 0.5K)^4 \quad (2\text{-}6)$$

Namely, on assumption that the phase depth of the first pit train 6 including the deep pits is X and that of the second pit train 7 including the shallow pits is Y, when these pit trains are formed to meet the above relations (2-5) and (2-6), the push-pull signal amplitude ratio is 0.10 or more, cross-track signal amplitude ratio is 0.05 or more and pit modulation is 0.08 or more, which assures stable tracking servo, track seek and signal reproduction.

On the other hand, a nearly linear line L3 connecting the points b1, b2, b3, b4 and b5 is expressed by a following relation (3-1), and a nearly linear line L4 connecting the points b5, b6, b7, b8, b9, b10, b11, b12 and b1 is expressed by a following relation (3-2):

$$Y=-301.2370+2943.8278X-10617.5544X^2+16767.2625X^3-9779.5969X^4 \quad (3\text{-}1)$$

$$Y=+10822.3214-136377.6645X+686724.6250X^2-1727199.1853X^3+2169848.4081X^4-1089274.1768X^5 \quad (3\text{-}2)$$

Therefore, the region defined by the points b1 to b12 can approximately be expressed by following relations (3-3) and (3-4):

$$Y \geq -301.2370+2943.8278X-10617.5544X^2+16767.2625X^3-9779.5969X^4 \quad (3\text{-}3)$$

$$Y \leq +10822.3214-136377.6645X+686724.6250X^2-1727199.1853X^3+2169848.4081X^4-1089274.1768X^5 \quad (3\text{-}4)$$

Namely, on the assumption that the phase depth of the first pit train 6 including the deep pits is X and that of the second pit train 7 including the shallow pits is Y, when these pit trains are formed to meet the above relations (3-3) and (3-4), the push-pull signal amplitude ratio is 0.10 or more, cross-track signal amplitude ratio is 0.05 or more and pit modulation is 0.08 or more, which assures stable tracking servo, track seek and signal reproduction.

Arbitrary integers N and L can be used to generalize the relations (3-3) and (3-4) like following relations (3-5) and (3-6):

$$Y \geq 0.5N-301.2370+2943.8278(X-0.5L)-10617.5544(X-0.5L)^2+16767.2625(X-0.5L)^3-9779.5969(X-0.5L)^4 \quad (3\text{-}5)$$

$$Y \leq 0.5N+10822.3214-136377.6645(X-0.5L)+686724.6250(X-0.5L)^2-1727199.1853(X-0.5L)^3+2169848.4081(X-0.5L)^4-1089274.1768(X-0.5L)^5 \quad (3\text{-}6)$$

Namely, on the assumption that the phase depth of the first pit train 6 including the deep pits is X and that of the second pit train 7 including the shallow pits is Y, when these pit trains are formed to meet the above relations (3-5) and (3-6), the push-pull signal amplitude ratio is 0.10 or more, cross-track signal amplitude ratio is 0.05 or more and pit modulation is 0.08 or more, which assures stable tracking servo, track seek and signal reproduction.

In the optical pickup used in this embodiment of the present invention, the laser light is 650 nm wavelength λ and numerical aperture NA of the objective lens is 0.52. Therefore, the cut-off frequency 2NA/λ of this optical pickup is 1600 nm$^{-1}$. On the other hand, since the track pitch TPitch of the evaluation optical discs is 0.70 μm, the spatial frequency of the track pitch TPitch is about 1430 mm$^{-1}$. Thus, in the evaluation optical discs, the spatial frequency of the track pitch TPitch is about 90% of the cut-off frequency 2NA/λ of the optical pickup.

In the prior art, when the spatial frequency of the track pitch TPitch is approximate to the cut-off frequency 2NA/λ of the optical pickup, the push-pull signal and cross-track signal cannot be produced at sufficient levels, respectively, so the tracking servo, track seek and signal reproduction cannot be done stably.

As known from the aforementioned experiment results, however, in the optical disc 1 according to the present invention, the first and second pit trains 6 and 7 are formed to meet the above relations (2-5) and (2-6) or (3-5) and (3-6), so that sufficient levels of the push-pull signal, cross-track signal and pit modulation can be assured while the spatial frequency of the track pitch TPitch can be increased up to about 90% of the cut-off frequency 2NA/λ of the optical pickup.

Namely, according to the present invention, the recording density can considerably be improved even with no modification of the optical system (such as change of light wavelength λ, numerical aperture NA of the objective lens, etc.), by reducing the tack pitch while assuring sufficient levels of the push-pull signal, cross-track signal and pit modulation.

<Optical Recording/reproducing Apparatus>

The optical recording/reproducing apparatus included in the first group of embodiments of the present invention uses the above-mentioned optical recording medium according to the present invention and effects the tracking servo using the push-pull signal and the track seek using the cross-track signal. Namely, the optical disc 1 is used as the optical recording medium according to the present invention and the push-pull method is adopted to effect the tracking servo. Note that the other configuration of the optical recording/reproducing apparatus according to the present invention may be similar to that of the conventional recording/reproducing apparatus. Therefore, the optical recording/reproducing apparatus according to the present invention will not be described any further.

Second Group of Embodiments

<Optical Disc>

Figure 7:
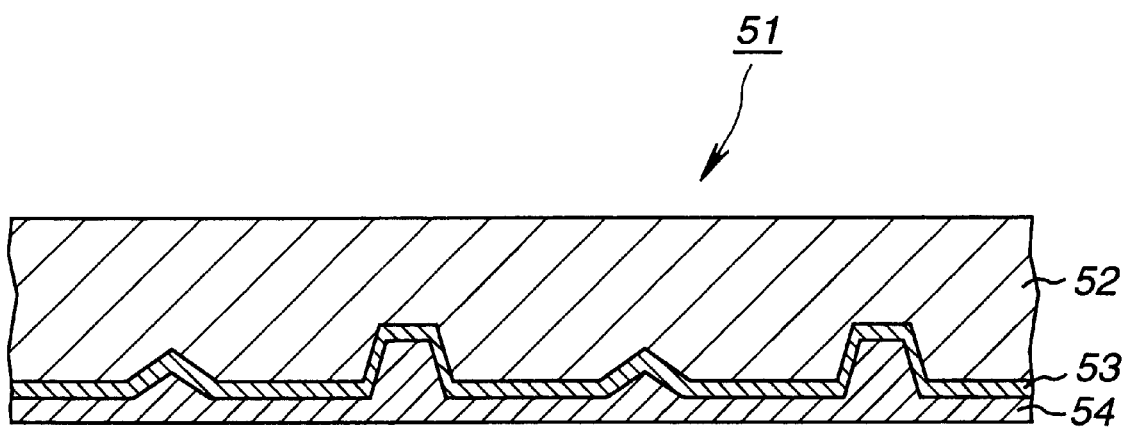
FIG. 7 is a fragmentary sectional view, enlarged in scale, of another embodiment of optical disc according to the present invention.

Referring now to FIG. 7, there is illustrated in the form of a sectional veiw, enlarged sin scale, of the essential portion of a second embodiment of optical disc according to the present invention. The Optical disc is generally indicated with a reference 51.

The optical disc 51 has data pre-recorded thereon in the form of a train of pits. The optical disc 51 comprises a substrate 52 made of polymethyl methacrylate (PMMA), polycarbonate (PC) or the like, a light reflective layer 53 made of aluminum (Al) or the like formed on the substrate 52, and a protective layer 54 formed on the light reflective layer 53 to protect the latter. The protective layer 54 has an ultraviolet-curable resin applied thereon by spin coating. It should be reminded that the present invention is not limited to this construction of the optical disc 51 from the light reflective layer 53 and protective layer 54.

Figure 8:
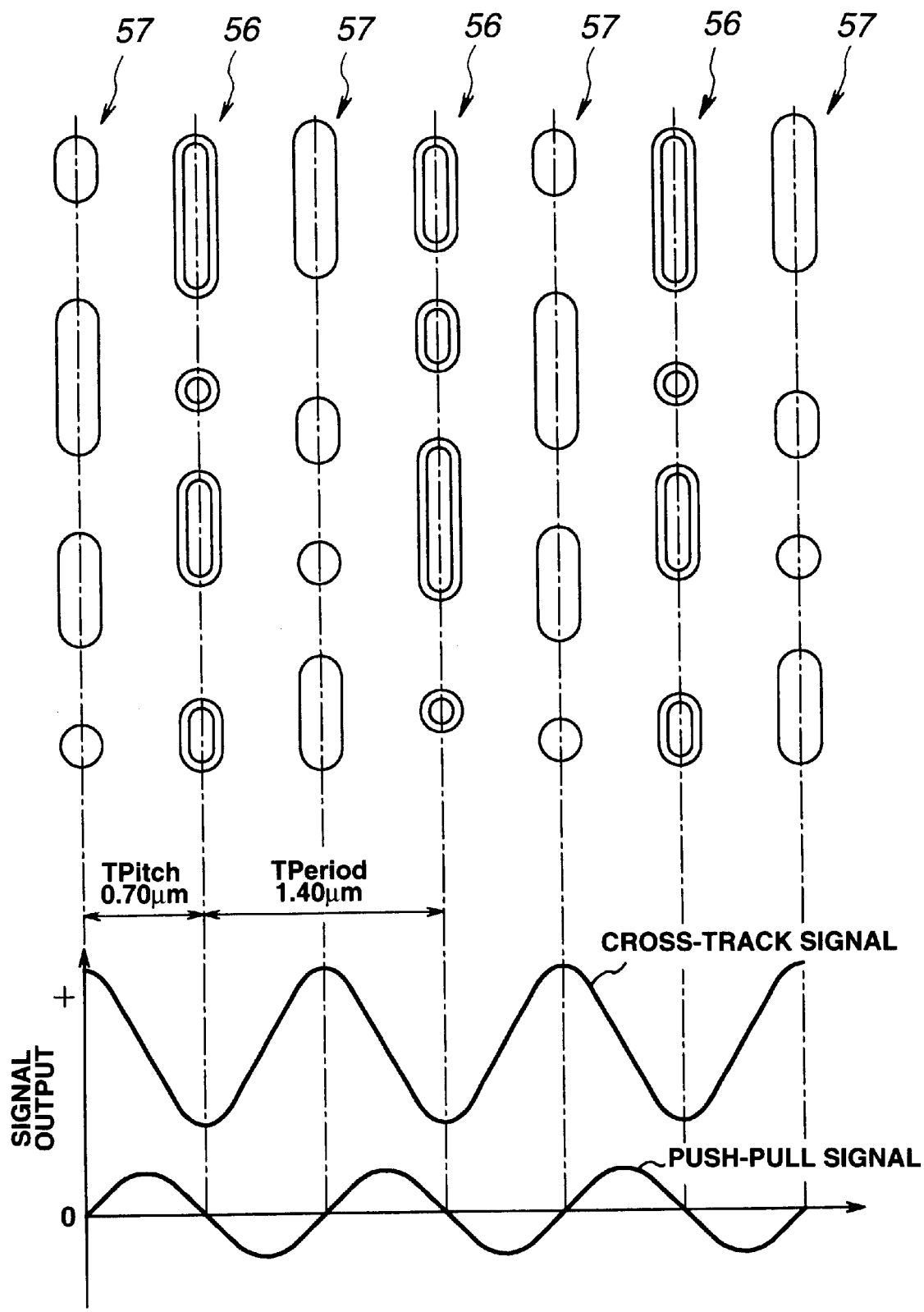
FIG. 8 is a plan view, enlarged in scale, of a portion of the recording area of the optical disc shown in FIG. 7.

FIG. 8 is a plan view, enlarged in scale, of a portion of the recording area of the optical disc 51 shown in FIG. 8. As shown, the disc substrate 52 has first pit trains 6 and second pit trains 7 formed thereon adjacently to each other and alternately. The first pit train 56 and second pit train 57 are different in pit depth from each other. The first and second pit trains 56 and 57 are formed on the disc substrate 52 to delineate a double spiral. FIG. 8 also shows a relation between the first and second pitch trains 56 and 57 and cross-track and push-pull signals produced from the optical disc 51.

In the optical disc 51, tracks are formed with a pitch TPitch of 0.70 μm. The track pitch TPitch is equivalent to an interval between the center line of the first pit train 56 and that of the second pit train 57 That is the interval between the first and second pit trains is 0.70 μm.

The interval between the center lines of the neighboring first pit trains 56 or that between center lines of the neighboring second pit trains 57 will be referred to as "track period TPeriod" hereinafter. The track period TPeriod is equivalent to double the track pitch TPitch. In this optical disc 51, the track period TPeriod is 1.40 μm.

In the optical disc 51 according the present invention, the first pit train 56 and second pit train 57 are formed to be different in pit depth from each other.

More specifically, on the assumption that the phase depth of the first pit train 56 is taken as X while that of the second pit train 57 is taken as Y and K, L, M and N are arbitrary integers, respectively, the first and second pit trains 56 and 57 are formed to meet the following relations (4-1) and (4-2) or (43) and (4-4):

$$Y \geq 0.5M + 35.8289 - 569.0171(X - 0.5K) + 3607.3326(X - 0.5K)^2 - 11369.4693(X - 0.5K)^3 + 17816.5986(X - 0.5K)^4 - 11104.0253(X - 0.5K)^5 \quad (4\text{-}1)$$

$$Y \leq 0.5M - 12.2807 + 148.0165(X - 0.5K) - 669.8877(X - 0.5K)^2 + 1466.8185(X - 0.5K)^3 - 1589.1663(X - 0.5K)^4 + 703.5593(X - 0.5K)^5 \quad (4\text{-}2)$$

$$Y \geq 0.5N - 226.5608 + 1670.0195(X - 0.5L) - 4087.700(X - 0.5L)^2 + 3326.6228(X - 0.5L)^3 \quad (4\text{-}3)$$

$$Y \leq 0.5N - 9579.2677 + 92165.2641(X - 0.5L) - 332399.1612(X - 0.5L)^2 + 532600.3255(X - 0.5L)^3 - 319883.9178(X - 0.5L)^4 \quad (4\text{-}4)$$

Note that on the assumption that the refractive index of a material (that is, the disc substrate 52) extending from the light incident surface of the optical disc 51 to a surface of the optical disc 51 on which the pit trains are formed is n, the phase depth X of the first pit train 56 is expressed by $x \times n/\lambda$ where x is the pit depth of the first pit train 56. Also, the phase depth Y of the second pit train 57 is expressed by $y \times n/\lambda$ where y is the pit depth of the second pit train 57.

In the optical disc 51 mentioned above, since the first and second pit trains 56 and 57 are formed to meet the relations (4-1) and (4-2) or (4-3) and (44), signals necessary for the tracking servo and track seek can be produced at sufficient levels, respectively, as will be evident from the results of experiments which will be given later.

Further in this optical disc 51, since the levels and polarities of the push-pull and cross-track signals vary as shown in FIG. 8, neighboring recording tracks can be discriminated from each other by detecting the levels and polarities of the push-pull and cross-track signals during track seek.

Further in this optical disc 51, since the first and second pit trains 56 and 57 are formed to meet the relations (4-1) and (4-2), or (4-3) and (4-4), a sufficient pit modulation can be provided to stably reproduce a signal as will be seen from the experiment results which will be given later.

Note that the optical disc 51 is similar in construction to the optical disc 1 having previously been described as in the first group of embodiments, except for the pit depth of the pit trains. Therefore, the optical disc 51 can be manufactured similarly to the optical disc 1.

<Evaluation of the Optical Disc>

Next, there will be described herebelow the results of an evaluation effected on a plurality of evaluation optical discs prepared by the aforementioned manufacturing method and whose first and second pit trains 56 and 57 are different in pit depth from each other. Note that in the following description, the first pit train 56 includes deep pits while the second pit train 57 includes shallow pits.

Note that the first and second pit trains 56 and 57 were controlled in pit depth by changing the power of the first and second exposure beams or changing the thickness of the photoresist formed on the glass substrate, during preparation of the optical recording medium manufacturing master.

For evaluation of the evaluation optical discs, the first exposure beam used to form the latent image for the first pit train and the second exposure beam used to form the latent image for the second pit train were changed in power or the thickness of the photoresist formed on the glass substrate was changed, to produce a plurality of optical recording medium manufacturing masters having formed thereon the first and second pit train patterns different in pit depth from each other. The masters were used to make evaluation optical discs, respectively, using the 2P method. Note that each of the evaluation optical discs had a disc substrate thereof made of polymethyl methacrylate of 1.49 in refractive index n.

Figure 9:
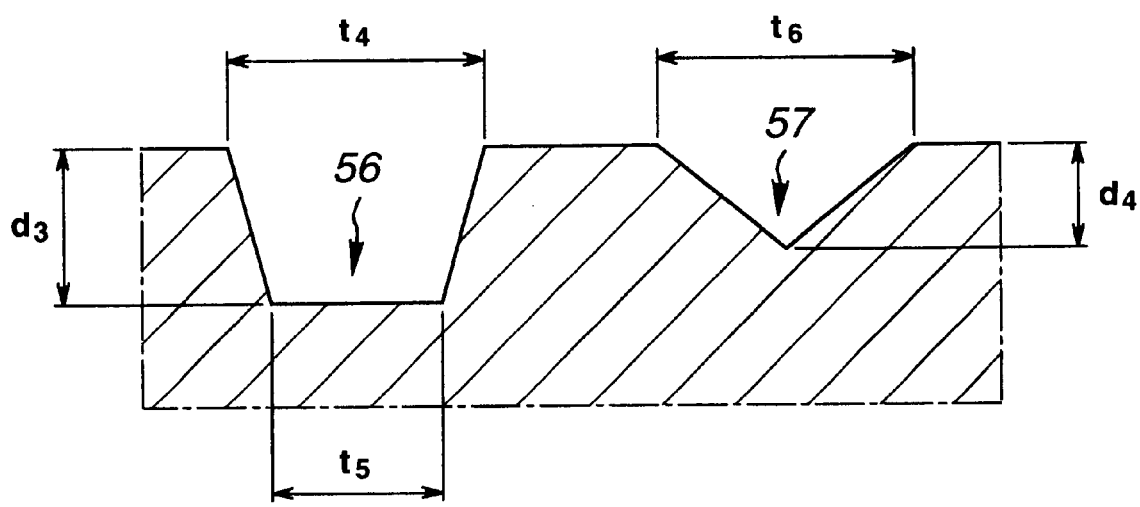
FIG. 9 is a fragmentary sectional view of an evaluation optical disc, showing pits formed, in the optical disc.

FIG. 9 is a fragmentary sectional view of an evaluation optical disc, showing pits formed in the optical disc.

It should be noted that other parameters of sectional shape, than the pit depth, of the fist and second pit trains 56 and 57 were generally the same for all the evaluation optical discs. More specifically, in each of the evaluation optical discs, the deep pits in the first pit train 56 were formed to have a top width t4 of about 300 nm and bottom width t5 of about 200 nm, while the shallow pits in the second pit train 57 were formed to have a V-shaped section whose top width t6 is about 300 nm, as shown in FIG. 9. Also, in each of the evaluation optical disc, the first pit train 56 has a pit depth d3 and the second pit train 57 has a pit depth d4. The pit depth d3 is different from d4 as will be evident from FIG. 8.

The evaluation optical discs had recorded two-eight (2-8) modulated random patterns as the first and second pit trains 56 and 57 so that the first and second pit trains 56 and 57 had a duty ratio of about 50% between them.

The plurality of evaluation optical discs thus prepared were evaluated as to their tracking servo and track seek characteristics and measured concerning their push-pull and cross-track signal amplitude ratios obtained from the evaluation optical discs. Also, the evaluation optical discs were measured as to the pit modulation of the shortest pit (2T pit). For these evaluation and measurement, an optical pickup was used in which the wavelength λ of the laser light used was 650 nm and the numerical aperture NA of the objective lens used was 0.52.

The measured push-pull and cross-track signal amplitude ratios and pit modulation are shown along with the pit depth of each of the pit trains formed on the evaluation optical discs in Tables 4 and 5.

TABLE 4

| Pit depth in nm | | Push-pull signal | Cross-track signal | Pit modulation | |
|---|---|---|---|---|---|
| First pit train | Second pit train | amplitude ratio | amplitude ratio | First pit train | Second pit train |
| 144 | 62  | 0.293 | 0.234 | 0.173 | 0.081 |
| 144 | 72  | 0.292 | 0.194 | 0.171 | 0.093 |
| 144 | 87  | 0.280 | 0.138 | 0.169 | 0.110 |
| 144 | 98  | 0.262 | 0.100 | 0.168 | 0.124 |
| 144 | 108 | 0.242 | 0.072 | 0.167 | 0.139 |
| 130 | 60  | 0.220 | 0.292 | 0.192 | 0.081 |
| 130 | 67  | 0.223 | 0.266 | 0.191 | 0.089 |
| 130 | 72  | 0.223 | 0.245 | 0.190 | 0.095 |
| 130 | 108 | 0.180 | 0.123 | 0.185 | 0.133 |
| 130 | 120 | 0.155 | 0.100 | 0.183 | 0.147 |
| 130 | 130 | 0.134 | 0.087 | 0.183 | 0.147 |
| 163 | 66  | 0.345 | 0.130 | 0.136 | 0.080 |
| 163 | 72  | 0.343 | 0.103 | 0.136 | 0.089 |
| 163 | 87  | 0.329 | 0.050 | 0.134 | 0.113 |
| 108 | 54  | 0.083 | 0.336 | 0.198 | 0.073 |
| 108 | 60  | 0.090 | 0.313 | 0.197 | 0.080 |
| 108 | 72  | 0.100 | 0.264 | 0.194 | 0.093 |
| 108 | 108 | 0.067 | 0.143 | 0.190 | 0.134 |

TABLE 5

| Pit depth in nm | | Push-pull signal | Cross-track signal | Pit modulation | |
|---|---|---|---|---|---|
| First pit train | Second pit train | amplitude ratio | amplitude ratio | First pit train | Second pit train |
| 100 | 65  | 0.050 | 0.284 | 0.190 | 0.083 |
| 100 | 72  | 0.054 | 0.347 | 0.188 | 0.086 |
| 100 | 90  | 0.051 | 0.185 | 0.185 | 0.110 |
| 186 | 87  | 0.318 | 0.069 | 0.086 | 0.115 |
| 186 | 96  | 0.301 | 0.102 | 0.086 | 0.129 |
| 186 | 108 | 0.272 | 0.142 | 0.087 | 0.145 |
| 186 | 144 | 0.174 | 0.177 | 0.090 | 0.165 |
| 186 | 186 | 0.110 | 0.133 | 0.087 | 0.148 |
| 191 | 108 | 0.258 | 0.159 | 0.080 | 0.145 |
| 191 | 144 | 0.158 | 0.200 | 0.083 | 0.165 |
| 191 | 173 | 0.102 | 0.175 | 0.082 | 0.156 |
| 191 | 191 | 0.091 | 0.147 | 0.080 | 0.144 |
| 100 | 72  | 0.050 | 0.251 | 0.187 | 0.091 |
| 167 | 67  | 0.350 | 0.103 | 0.127 | 0.080 |
| 171 | 144 | 0.196 | 0.105 | 0.111 | 0.163 |
| 197 | 131 | 0.185 | 0.206 | 0.080 | 0.168 |

Note that although Tables 4 and 5 show the pit depth of the pit trains formed on the evaluation optical discs, the pit depth values were actually obtained by using an atomic force microscope (AFM) to measure the pit train patterns formed on the optical recording medium manufacturing master, not by measuring the evaluation optical discs themselves. That is to say, on the assumption that the pit train patterns formed of the master would be replicated to the disc substrate with a high accuracy, the results of measurement of the pit train patterns formed on the master were used as values which indicate the sectional shapes of the pit trains in the evaluation optical discs.

Each of the evaluation optical discs was determined as to the tracking servo and track seek characteristics as well as to the relation between the push-pull and cross-track signal amplitude ratios, resulted when the 3P method was used. As the results reveal, when the push-pull signal amplitude ratio is 0.10 or more, the tracking servo could stably be effected using the push-pull signal. When the push-pull signal amplitude ratio was 0.10 or more and cross-track signal amplitude ratio was 0.05 or more, the track seek could stably be effected with each recording track identified by detecting the level and polarity of each of the push-pull and cross-track signals. As known from this fact, the tracking servo and track seek can be effected on an optical disc designed for a push-pull signal amplitude ratio of 0.10 or more and a cross-track signal amplitude ratio of 0.05 or more. Also, it was found that when the pit modulation was 0.08 or more, signal could be reproduced with a sufficiently low error rate.

In this situation, the pit depth of the first pit train 56 and that of the second pit train 57 were measured when the push-pull signal amplitude ratio was 0.10 or more, cross-track signal amplitude ratio was 0.05 or more and pit modulation was 0.08 or more.

Figure 10:
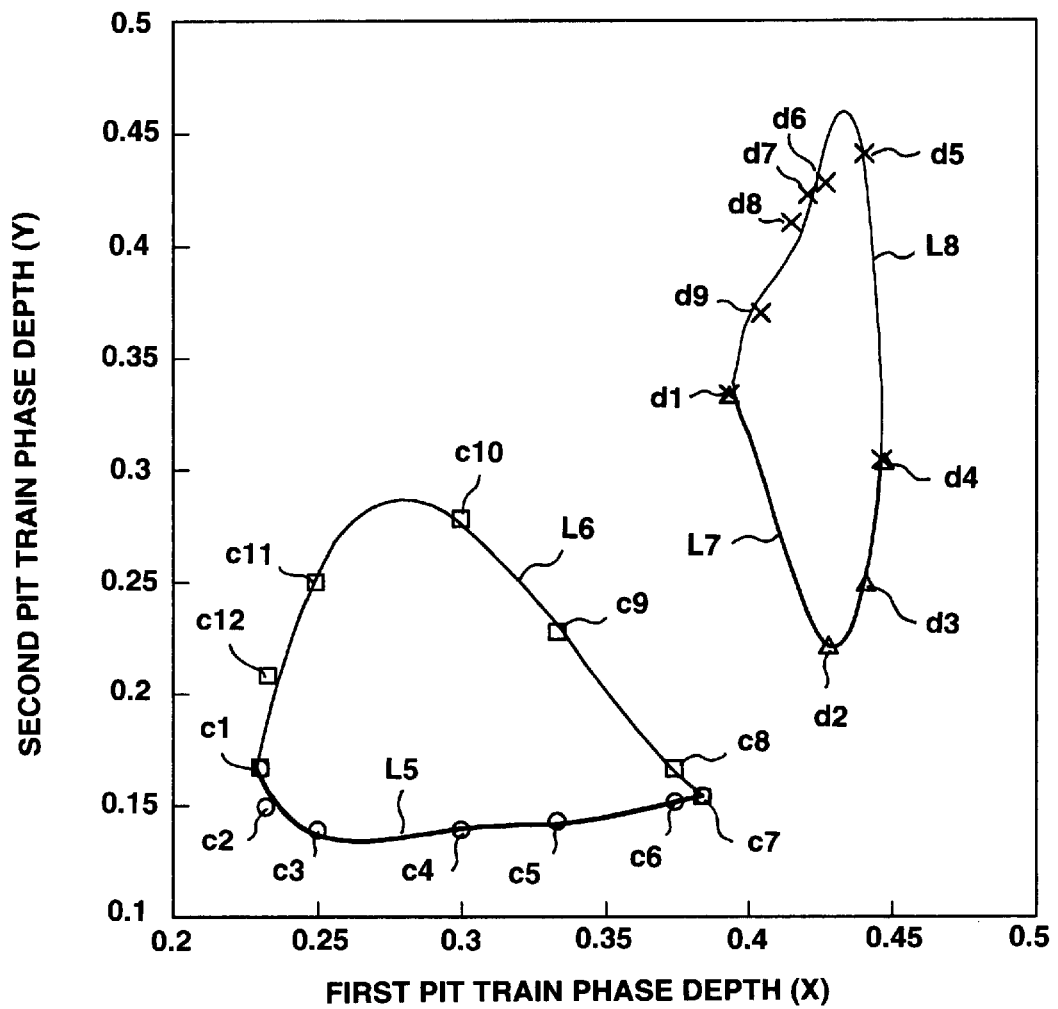
FIG. 10 graphically shows measured pit depth of each of first and second pit trains when the push-pull signal amplitude is 0.10 or more, cross-track signal amplitude is 0.05 or more and pit modulation is 0.08 or more.

FIG. 10 graphically shows the measured pit depth of each of the first and second pit trains. It was found from the measurement results that within a region defined by points c1, c2, c3, c4, c5, c6, c7, c8, c9, c10, c11 and a12 in FIG. 10 or within a region defined by points d1, d2, d3, d4, d5, d6, d7, d8 and d9 in FIG. 10, the push-pull signal amplitude ratio is 0.10 or more, cross-track signal amplitude ratio is 0.05 or more and pit modulation is 0.08 or more.

In FIG. 10, the phase depth X of the first pit train 56 (including the deep pits) is taken along the horizontal axis while the phase depth Y of the second pit train 57 (including the shallow pits) is along the vertical axis.

A nearly linear line L5 connecting the points c1, c2, c3, c4, c5, c6 and c7 in FIG. 6 is expressed by a following relation (5-1), and a nearly linear line L6 connecting the points c7, c8, c9, c10, c11, c12 and c1 is expressed by a following relation (5-2):

$$Y = +35.8289 - 569.0171X + 3607.3326X^2 - 11369.4693X^3 + 17816.5986X^4 - 11104.0253X^5 \quad (5\text{-}1)$$

$$Y = -12.2807 + 148.0165X - 669.8877X^2 + 1466.8185X^3 - 1589.1663X^4 + 703.5593X^5 \quad (5\text{-}2)$$

Therefore, the region defined by the points c1 to c12 can approximately be expressed by following relations (5-3) and (5-4):

$$Y \geq +35.8289 - 569.0171X + 3607.3326X^2 - 11369.4693X^3 + 17816.5986X^4 - 11104.0253X^5 \quad (5\text{-}3)$$

$$Y \leq -12.2807 + 148.0165X - 669.8877X^2 + 1466.8185X^3 - 1589.1663X^4 + 703.5593X^5 \quad (5\text{-}4)$$

Namely, on the assumption that the phase depth of the first pit train 56 including the deep pits is X and that of the second pit trains 57 including the shallow pits is Y, when these pit trains are formed to meet the above relations (5-3) and (5-4), the push-pull signal amplitude ratio is 0.10 or more, cross-track signal amplitude ratio is 0.05 or more and pit modulation is 0.08 or more, which assures stable tracking servo, track seek and signal reproduction.

The principle of light diffraction is such that within a coherent length, the same diffraction effect will take place at every integral multiple of a wavelength. Therefore, even if an optical path along which a light is incident upon a pit train and it travels back is increased or decreased in units of an integral multiple of a wavelength, a similar diffraction effect will take place. Namely, even with the phase depths X and Y of the pit trains increased or, decreased in units of an integral multiple of a half wavelength, a similar diffraction effect will take place. Therefore, arbitrary integers M and K can be used to generalize the relations (5-3) and (5-4) like following relations (5-5) and (5-6):

$$Y \geq 0.5M + 35.8289 - 569.0171(X - 0.5K) + 3607.3326(X - 0.5K)^2 - 11369.4693(X - 0.5K)^3 + 17816.5986(X - 0.5K)^4 - 11104.0253(X - 0.5K)^5 \quad (5\text{-}5)$$

$$Y \leq 0.5M - 12.2807 + 148.0165(X - 0.5K) - 669.8877(X - 0.5K)^2 + 1466.8185(X - 0.5K)^3 - 1589.1663(X - 0.5K)^4 + 703.5593(X - 0.5K)^5 \quad (5\text{-}6)$$

Namely, on the assumption that the phase depth of the first pit train 56 including the deep pits is X and that of the second pit train 57 including the shallow pits is Y, when these pit trains are formed to meet the above relations (5-5) and (5-6), the push-pull signal amplitude ratio is 0.10 or more, cross-track signal amplitude ratio is 0.05 or more and pit modulation is 0.08 or more, which assures stable tracking servo, track seek and signal reproduction.

On the other hand, a nearly linear line L7 connecting the points d1, d2, d3 and d4 is expressed by a following relation (6-1), and a nearly linear line L8 connecting the points d4, d5, d6, d7, d8, d9 and d1 is expressed by a following relation (6-2):

$$Y = -226.5608 + 1670.0195X - 4087.700X^2 + 3326.6228X^3 \quad (6\text{-}1)$$

$$Y = -9579.2677 + 92165.2641X - 332399.1612X^2 + 532600.3255X^3 - 319883.9178X^4 \quad (6\text{-}2)$$

Therefore, the region defined by the points d1 to d9 can approximately be expressed by following relations (6-3) and (6-4):

$$Y \geq -226.5608 + 1670.0195X - 4087.700X^2 + 3326.6228X^3 \quad (6\text{-}3)$$

$$Y \leq -9579.2677 + 92165.2641X - 332399.1612X^2 + 532600.3255X^3 - 319883.9178X^4 \quad (6\text{-}4)$$

Namely, on the assumption that the phase depth of the first pit train 56 including the deep pits, is X and that of the second pit train 57 including the shallow pits is Y, When these pit trains are formed to meet the above relations (6-3) and (6-4), the push-pull signal amplitude ratio is 0.10 or more, cross-track signal amplitude ratio is 0.05 or more and pit modulation is 0.08 or more, which assures stable tracking servo, track seek and signal reproduction.

Arbitrary integers N and L can be used to generalize the relations (6-3) and (6-4) like following relations (6-5) and (6-6):

$$Y \geq 0.5N - 226.5608 + 1670.01955(X-0.5L) - 4087.700(X-0.5L)^2 + 3326.6228(X-0.5L)^3 \quad (6\text{-}5)$$

$$Y \leq 0.5N - 9579.2677 + 92165.2641(X-0.5L) - 332399.1612(X-0.5L)^2 + 532600.3255(X-0.5L)^3 - 319883.9178(X-0.5L)^4 \quad (6\text{-}6)$$

Namely, on the assumption that the phase depth of the first pit train 56 including the deep pits is X and that of the second pit train 57 including the shallow pits is Y, when these pit trains are formed to meet the above relations (6-5) and (6-6), the push-pull signal amplitude ratio is 0.10 or more, cross-track signal amplitude ratio is 0.05 or more and pit modulation is 0.08 or more, which assures stable tracking servo, track seek and signal reproduction.

In the optical pickup used in this embodiment of the present invention, the laser light is 650 nm in wavelength $\lambda$ and numerical aperture NA of the objective lens is 0.52. Therefore, the cut-off frequency $2NA/\lambda$ of this optical pickup is 1600 nm$^{-1}$. On the other hand, since the track pitch TPitch of the evaluation optical discs is 0.70 $\mu$m, the spatial frequency of the track pitch, TPitch is about 1430 mm$^{-1}$. Thus, in the evaluation optical discs, the spatial frequency of the track pitch TPitch is about 90% of the cut-off frequency $2NA/\lambda$ of the optical pickup.

In the prior art, when the spatial frequency of the track pitch TPitch is approximate to the cut-off frequency $2NA/\lambda$ of the optical pickup, the push-pull signal and cross-track signal cannot be produced at sufficient levels, respectively, so the tracking servo, track seek and signal reproduction cannot be done stably.

As known from the aforementioned experiment results, however, in the optical disc 51 according to the present invention, the first and second pit trains 56 and 57 are formed to meet the above relations (5-5) and (5-6) or (6-5) and (6-6), so that sufficient levels of the push-pull signal, cross-track signal and pit modulation can be assured while the spatial frequency of the track pitch TPitch can be increased up to about 90% of the cut-off frequency $2NA/\lambda$ of the optical pickup.

Namely, according to the present invention the recording density can considerably be improved even with no modification of the optical system (such as change of light wavelength $\lambda$, numerical aperture NA of the objective lens, etc.), by reducing the tack pitch while assuring sufficient levels of the push-pull signal, cross-track, signal and pit modulation.

<Optical Recording/reproducing Apparatus>

The optical recording/reproducing apparatus included in the second group of embodiments the present invention uses the above-mentioned optical recording medium according to the present invention and effects the tracking servo using the cross-track signal and the track seek using the push-pull signal. Namely, the optical disc 51 is used as the optical recording medium according to the present invention and the three-spot method is adopted to effect the tracking servo. Note that the other configuration of the optical recording/reproducing apparatus according to the present invention may be similar to that of the conventional recording/reproducing apparatus. Therefore, the optical recording/reproducing apparatus according to the present invention will not be described any further.

In the foregoing, the present invention has been described concerning two groups of embodiments thereof. However, the present invention is not limited to these two groups of embodiments. For example, the first and second groups of embodiments have been described concerning the optical disc having a pair of pit trains formed thereon in the form of a double spiral, but the optical recording medium according to the present invention may have a pit train having deep pits and another having shallow pits, the pit trains being adjacent to each other. Namely, the present invention is not limited to the double-spiral pit train pattern. That is to say, the present invention is applicable to an optical disc having a pair of pit trains formed concentrically thereon, as well. The first and second embodiments have been described concerning the optical discs having data pre-recorded therein the form of a pit train. However, the optical recording medium according to the present invention may have in at least a portion thereof an area in which data is recorded as a pit train and in the other portion thereof an area in which data can be written by magneto-optical or phase-change recording.

As having been described in the foregoing, the present invention provides an optical record medium capable of stable tracking servo and track seek as well as sufficient pit modulation, even with a very small track pitch. Therefore, the present invention can attain a further high recording density with a further small track pitch.

What is claimed is:

1. An optical recording medium having a train of pits formed along a recording track thereof and to and/or from which data is written and/or read by focusing thereon a light having a predetermined wavelength;

the train of pits being formed from first and second pit trains adjacent to each other, and the pits in one of the pit trains being different in depth from those in the other pit train; and the first and second pit trains being formed to meet following relations (1) and (2) or (3) and (4) on the assumption that:

the refractive index of a material extending from the light incident surface of the optical recording medium to a surface of the optical recording medium on which the pit trains are formed is n;

the wavelength of a light used to write and/or read data to and/from the optical recording medium is $\lambda$;

the depth of the pits in the first train is x;

the depth of the pits in the second train is y;

the phase depth of the first pit train expressed by x×n/$\lambda$ is X;

the phase depth of the second pit train expressed by y×n/$\lambda$ is Y; and

K, L, M and N are arbitrary integers, respectively:

$$Y \geq 0.5M + 73.0411 - 1098.4983(X-0.5K) + 6584.7191(X-0.5K)^2 - 19632.4312(X-0.5K)^3 + 29119.8871(X-0.5K)^4 - 17190.8276(X-0.5K)^5 \quad (1)$$

$$Y \leq 0.5M - 27.1270 + 807.9548(X-0.5K) - 1283.3732(X-0.5K)^2 + 2358.2052(X-0.5K)^3 - 1620.1442(X-0.5K)^4 \quad (2)$$

$$Y \geq 0.5N - 301.2370 + 2943.8278(X-0.5L) - 10617.5544(X-0.5L)^2 +$$

$$16767.2625(X-0.5L)^3-9779.5969(X-0.5L)^4 \quad (3)$$

$$Y \leq 0.5N+10822.3214-136377.6645(X-0.5L)+686724.6250(X-0.5L)^2-1727199.1853(X-0.5L)^3+2169848.4081(X-0.5L)^4-1089274.1768(X-0.5L)^5. \quad (4)$$

2. A master for use to produce an optical recording medium having pit trains formed along recording tracks thereof and to and/or from which data is written and/or read by focusing thereon a light having a predetermined wavelength, the master having formed thereon:

concavity-convexity patterns for the pit trains of pits, formed for first and second ones of the to be adjacent to each other; and the first and second pit train patterns being formed to meet following relations (5) and (6) or (7) and (8) on the assumption that:

the refractive index of a material extending from the light incident surface of the optical recording medium to a surface of the optical recording medium on which the pit trains are formed is n;

the wavelength of a light used to write and/or read data to and/from the optical recording medium is $\lambda$;

the depth of the pits in the first train is x';

the depth of the pits in the second train is y';

the phase depth of the first pit train expressed by $x' \times n/\lambda$ is X';

the phase depth of the second pit train expressed by $y' \times n/\lambda$ is Y'; and K, L, M and N are arbitrary integers, respectively:

$$Y' \geq 0.5M+73.0411-1098.4983(X'-0.5K)+6584.7191$$

$$(X'-0.5K)^2-19632.4312(X'-0.5K)^3+29119.8871$$

$$(X'-0.5K)^4-17190.8276(X'-0.5K)^5 \quad (5)$$

$$Y' \leq 0.5M-27.1270+307.9548(X'-0.5K)-1283.3732$$

$$(X'-0.5K)^2+2358.2052(X'-0.5K)^3 1620.1442$$

$$(X'-0.5K)^4 \quad (6)$$

$$Y' \geq 0.5N-301.2370+2943.8278(X'-0.5L)-10617.5544$$

$$(X'-0.5L)^2+16767.2625(X'-0.5L)^3-9779.5969$$

$$(X'-0.5L)^4 \quad (7)$$

$$Y' \leq 0.5N+10822.3214-136377.6645$$

$$(X'-0.5L)+686724.6250(X'-0.5L)^2-1727199.1853$$

$$(X'-0.5L)^3+2169848.4081(X'-0.5L)^4 1089274.1768$$

$$(X'-0.5L)^5. \quad (8)$$

* * * * *

UNITED STATES PATENT AND TRADEMARK OFFICE
CERTIFICATE OF CORRECTION

PATENT NO. : 6,556,537 B2  
DATED : April 29, 2003  
INVENTOR(S) : Sohmei Endoh

It is certified that error appears in the above-identified patent and that said Letters Patent is hereby corrected as shown below:

Title page,
Item [57], ABSTRACT,
Line 1, remove the comma after "an";
indented, delete the formulas and replace them with the following:

$$-- Y \geq 0.5M + 73.0411 - 1098.4983(X - 0.5K) + 6584.7191(X - 0.5K)^2$$
$$-19632.4312(X - 0.5K)^3 + 29119.8871(X - 0.5K)^4$$
$$- 17190.8276(X - 0.5K)^5$$

$$Y \leq 0.5M - 27.1270 + 307.9548(X - 0.5K) - 1283.3732(X - 1.5K)^2$$
$$+ 2358.2052(X - 0.5K)^3 - 1620.1442(X - 0.5K)^4 --.$$

Column 3,
Line 60, change "train,of" to -- train of --.

Column 4,
Line 31, delete "be".

Column 5,
Line 14, change "first maser" to -- first master --.

Column 6,
Line 23, delete the formula and replace it with the following:

$$-- Y \leq 0.5N - 9579.2677 + 92165.2641(X - 0.5L)$$
$$- 332399.1612(X - 0.5L)^2 + 532600.3255(X - 0.5L)^3$$
$$- 319883.9178(X - 0.5L)^4 \qquad (16) --;$$

Line 32, delete "be";
Line 54, change "the of" to -- the depth of --;
Line 62, delete the formula and replace it with the following:

$$-- Y' \geq 0.5M + 35.8289 - 569.0171(X'-0.5K) + 3607.3326(X' - 0.5K)^2$$
$$- 11369.4693(X' - 0.5K)^3 + 17816.5986(X' - 0.5K)^4$$
$$- 11104.0253(X' - 0.5K)^5 \qquad (17) --.$$

Column 7,
Line 58, change "tack" to -- track seek --;
Line 60, change "intention" to -- invention --.

UNITED STATES PATENT AND TRADEMARK OFFICE
CERTIFICATE OF CORRECTION

PATENT NO. : 6,556,537 B2
DATED : April 29, 2003
INVENTOR(S) : Sohmei Endoh

It is certified that error appears in the above-identified patent and that said Letters Patent is hereby corrected as shown below:

Column 8,
Line 8, change "maser for used to" to -- master used to--;
Line 46, change "togas" to -- to as --.

Column 9,
Line 5, change "plane" to -- plan --;
Line 8, change "train" to -- trains --.
Line 42, delete the formula and replace it with the following:

$$--Y \geq 0.5N - 301.2370 + 2943.8278(X-0.5L) - 10617.5544(X-0.5L)^2 + 16767.2625(X-0.5L)^3 - 9779.5969(X-0.5L)^4 \quad (1\text{-}3)--;$$

Line 52, change "tram" to -- train --;

Column 10,
Line 46, change "adjust-the" to -- adjust the --;

Column 13,
Line 2, change "diameter" to -- diameters --;
Line 18, change "expose" to -- exposure --;
Line 52, change "objectives" to -- objective lens --.

Column 14,
Line 14, change "particular" to -- particularly --;
Line 16, change "be" to -- the --.

Column 18,
Line 27, delete the formula and replace it with the following:

$$--Y = -27.1270 + 307.9548X - 1283.3732X^2 + 2358.2052X^3 - 1620.1442X^4 \quad 2\text{-}2)--;$$

Line 29, change "points al to" to -- points to --;
Line 58, delete the formula and replace it with the following:

$$--Y \geq 0.5M + 73.0411 - 1098.4983(X-0.5K) + 6584.7191(X-0.5K)^2 - 19632.4312(X-0.5K)^3 + 29119.8871(X-0.5K)^4 - 17190.8276(X-0.5K)^5 \quad 2\text{-}5)--.$$

Column 20,
Line 33, change "veiw" to -- view --;
Line 33, change "sin" to -- in --.

UNITED STATES PATENT AND TRADEMARK OFFICE
CERTIFICATE OF CORRECTION

PATENT NO. : 6,556,537 B2
DATED : April 29, 2003
INVENTOR(S) : Sohmei Endoh

It is certified that error appears in the above-identified patent and that said Letters Patent is hereby corrected as shown below:

<u>Column 21,</u>
Line 11, change "(43)" to -- (4-3) --;
Line 33, change "(44)" to -- (4-4) --.

<u>Column 23,</u>
Line 29, change "formed of" to -- formed on --.

<u>Column 24,</u>
Line 22, change "pit trains 57" to -- pit train 57 --.

<u>Column 25,</u>
Line 64, insert -- of -- after "embodiments".

Signed and Sealed this

Ninth Day of March, 2004

JON W. DUDAS
*Acting Director of the United States Patent and Trademark Office*